United States Patent [19]

Sakama et al.

[11] Patent Number: 5,712,744
[45] Date of Patent: Jan. 27, 1998

[54] MAGNETIC TAPE LOADING DEVICE

[75] Inventors: Mitsunori Sakama; Joichi Daiba; Satoshi Ota; Toshiya Kurokawa; Katsumi Maekawa, all of Tokyo, Japan

[73] Assignee: Sony Corporation, Tokyo, Japan

[21] Appl. No.: 728,161

[22] Filed: Oct. 9, 1996

[30] Foreign Application Priority Data

Oct. 13, 1995 [JP] Japan ................................. 7-265947
Nov. 8, 1995 [JP] Japan ................................. 7-314669

[51] Int. Cl.$^6$ ................................. G11B 15/665
[52] U.S. Cl. ................................. 360/85
[58] Field of Search ................................. 360/85

[56] References Cited

U.S. PATENT DOCUMENTS 5,490,019  2/1996  Konishi et al. ................................. 360/85
5,550,686  8/1996  Matsuoka et al. ................................. 360/85
5,638,231  6/1997  Okuda et al. ................................. 360/85

Primary Examiner—Robert S. Tupper
Attorney, Agent, or Firm—Jay H. Maioli

[57] ABSTRACT

A magnetic tape loading device of which the main body portion may be reduced in size and which assures positive contact under pressure of a magnetic tape with a sliding surface of a drum-shaped magnetic head. The loading device includes a driving unit 21, a first transmission unit 22 driven by the driving unit 21, a first magnetic tape actuating unit 25 moved by the first transmission unit 22 for pulling out a magnetic tape 4 placed on a tape supply reel 8 and a second transmission unit 23 driven by the first transmission unit 22. The loading device also includes second magnetic tape actuating units 26, 27 moved by the second transmission unit 23 for pulling out the magnetic tape 4 for abutting the tape thus pulled out against a sliding surface 90 of a drum-shaped magnetic head 18, a third transmission unit 24 driven by the second transmission unit 23 and third magnetic tape actuating units 28, 29 moved by the third transmission unit 24 for pulling out the magnetic tape placed on a tape take-up reel 9.

6 Claims, 23 Drawing Sheets (-17 DEGREES)

(-3 DEGREES)

(206 DEGREES)

(301 DEGREES)

(315 DEGREES)

1

MAGNETIC TAPE LOADING DEVICE

BACKGROUND OF THE INVENTION

1. Field of the Invention

This invention relates to a loading device in which a tape-shaped recording medium, such as a magnetic tape, is pulled out of a tape cassette and abutted against the tape-shaped recording medium.

2. Description of the Related Art

Up to now, a recording/reproducing apparatus, such as a video tape recorder employing a video tape cassette housing a tape-shaped recording medium, such as a magnetic tape, has been used extensively. This video tape recorder has a loading mechanism for pulling out the magnetic tape from the inside of the video tape cassette and abutting the magnetic tape thus pulled out against the drum-shaped magnetic head.

Referring to FIG. 1, such a conventional loading device 100 includes a driving motor 101 and a first driving unit 102 driven by this driving motor 101. The loading device 100 also includes a ring gear 103 rotated by the first driving unit 102, and a second driving unit 104 driven by this ring gear 103. The loading device also includes first and second arm driving units 105, 106 driven by this driving gear 104. The loading apparatus further includes first and second arms 107, 108 rotated by the first and second arm driving units 105, 106, respectively. The ring gear 103 of the loading apparatus 100 is rotated via the first loading unit 102 by the driving motor 101 being run in rotation. The ring gear 103 is made up of first and second ring gears stacked together. The second driving unit 104 is run in rotation by rotation of the first and second ring gears.

The second driving unit 104 is run in rotation for rotating a worm shaft 105A of the first arm driving unit 105 and a worm shaft 106A of the second worm shaft 108. The first arm driving unit 105 and the second arm driving unit 106, run in rotation, rotates the first arm 107 and the second arm 108 sideways for pulling out a magnetic tape 111 from a video tape cassette 110 for abutting the magnetic tape 111 against a drum-shaped magnetic head. In this state, the video tape recorder causes the magnetic tape 111 to be run at a constant velocity, while rotating the drum-shaped magnetic head for recording/reproducing the magnetic tape 111.

For positively abutting the magnetic tape 111 against the outer peripheral sliding surface of the drum-shaped magnetic head, the loading device 100 has enclosed therein a limiting spring for applying a pre-set tension to the magnetic tape 111. As a loading device having the enclosed limiting spring, there are three sorts of loading apparatus of different structures.

The first loading device includes a first arm on which a tape guide is set upright, and a second arm connected to this first arm. A limiting spring is installed between a chassis and the vicinity of a pivot shaft of the second arm. With the first loading device, the second arm biased by the spring force accumulated in the limiting spring thrusts the first arm so that a pre-set tape tension is applied by the tape guide to the magnetic tape.

The second loading device includes a first arm on which is set upright a tape guide, a second arm connected to the first arm and a third arm connected to this second arm. A limiting spring is installed between a chassis and the vicinity of a pivot shaft of the third arm. With the second loading device, the third arm biased by the spring force accumulated in the limiting spring thrusts the first and second arms so that the pre-set tape tension is applied by the tape guide to the magnetic tape.

The third loading device includes a first ring gear on which a first tape guide is mounted upright, and a second ring gear on which a second tape guide is mounted upright in superimposition on the first ring gear, with a limiting spring being installed between the first and second ring gears. With the third loading device, the first tape guide and the second tape guide, biased in mutually opposite directions under the bias of the spring force accumulated in the limiting spring, exert a pre-set tape tension on the magnetic tape.

Meanwhile, a video tape recorder tends to be reduced in size in view of convenience in transportation and for lowering the cost. With a video tape recorder 120, thus reduced in size, a cassette holder 122 and a main substrate installing space 123 are provided within the inside of a substantially rectangular casing 121. This casing 121 has a height of 41.25 mm and a width of 101.6 mm as measured on its upper surface. The cassette holder 122 has a height of 29.6 mm inclusive of movement height of the video tape cassette 110. The main substrate installing space 123 has a height of 6.6 mm. Each of the cassette holder 122 and the main substrate installing space 123 has a width of 99.4 mm, exclusive of the width of the video tape cassette 110 of 101.6 mm, the thickness of 0.8 mm and the clearance of 0.3 mm of the casing 121.

In a mid portion of the video tape recorder 120 facing a cassette inserting aperture 124 via which is inserted a video tape cassette 110 into the cassette holder 121, there is mounted a drum-shaped magnetic head for recording or reading out data signals from a magnetic tape 111. The drum-shaped magnetic head has a diameter of 40 mm.

Thus the size of the loading device installing space 125, in which to install the loading device, corresponds to the space defined by the height of 5.05 mm, obtained on subtracting the height of the cassette container 122 and the main substrate installing space 123, and a width of 99.4 mm, less the space occupied by the drum-shaped magnetic head.

The above-described first loading device has a drawback that, if it is attempted to install the loading device in the loading device installing space in the video tape recorder, it becomes impossible to install any other components, such as tape guides, because the first and second arms have to be moved over an extended distance.

The above-described first loading device has a drawback that, if it is attempted to install the loading device in the loading device installing space in the video tape recorder, the first to third arms are of insufficient lengths, such that the magnetic tape cannot be abutted by the tape guides against the entire outer peripheral surface of the drum-shaped magnetic head.

In addition, the third loading device has a drawback that, if it is attempted to install the loading device in the loading device installing space of the video tape recorder, a sufficient space in which to install a limiting spring is not available between the first and second ring gears.

SUMMARY OF THE INVENTION

It is therefore an object of the present invention to provide a loading device in which a main body portion of the apparatus may be reduced in size in conjunction with reduction in size of the video tape recorder and in which the magnetic tape can be reliably contacted under pressure with the sliding surface of a drum-shaped magnetic head.

The present invention provides a loading device includes driving means having a driving gear, first transmission means having a transmission gear driven by the driving means, first magnetic tape actuating means moved by the first transmission means for pulling out a magnetic tape placed on a tape supply reel, second transmission means having a transmission gear driven by the first transmission means, second magnetic tape actuating means moved by the second transmission means for pulling out the magnetic tape for abutting the tape thus pulled out against a sliding surface of a drum-shaped magnetic head, third transmission means having a transmission gear driven by the second transmission means, and third magnetic tape actuating means moved by the third transmission means for pulling out the magnetic tape placed on a tape take-up reel.

With the loading device according to the present invention, if driving gears of driving meas are run in rotation, the transmission gears of the first transmission means, second transmission means and the third transmission means are run in rotation. If the transmission gears of the first transmission means, second transmission means and the third transmission means are run in rotation, the first magnetic tape actuating means, second magnetic tape actuating means and the third magnetic tape actuating means operate for pulling out the magnetic tape. At this time, the second magnetic tape actuating means abuts the magnetic tape against the sliding surface of the drum-shaped magnetic head. By the spring force stored in an elastic member, the second magnetic tape actuating means impart a pre-set tape tension to the magnetic tape for abutting the magnetic tape more reliably against the sliding surface of the drum-shaped magnetic head.

With the loading device according to the present invention, the first to third transmission means are each provided with a transmission gear, and the magnetic tape is pulled out via these respective transmission gears by the first to third magnetic tape actuating means, thus enabling the main body portion of the loading device to be reduced in size.

Moreover, since the spring force is stored in the elastic member as a result of rotation of the first transmission gear and thence transmitted to the second transmission gear, the magnetic tape may be abutted more positively against the sliding surface of the drum-shaped magnetic head via second magnetic tape actuation means which has pulled out the magnetic tape and which has abutted the tape thus pulled out against the sliding surface of the drum-shaped magnetic head.

In addition, with the present loading device, since the thrusting member thrusts the roll supporting member which has pulled out the magnetic tape and abutted the tape thus pulled out against the magnetic tape control member, the magnetic tape may be contacted under pressure more reliably via roll with the magnetic tape control member.

BRIEF DESCRIPTION OF THE DRAWINGS

FIGS. 21A, 21B and 21C show a mode switch according to an embodiment of the present invention, wherein FIG. 21A shows the switch in a cross-sectional side view and FIGS. 21B and 21C show the switch in plan views.

DESCRIPTION OF THE PREFERRED EMBODIMENTS

Figure 1:
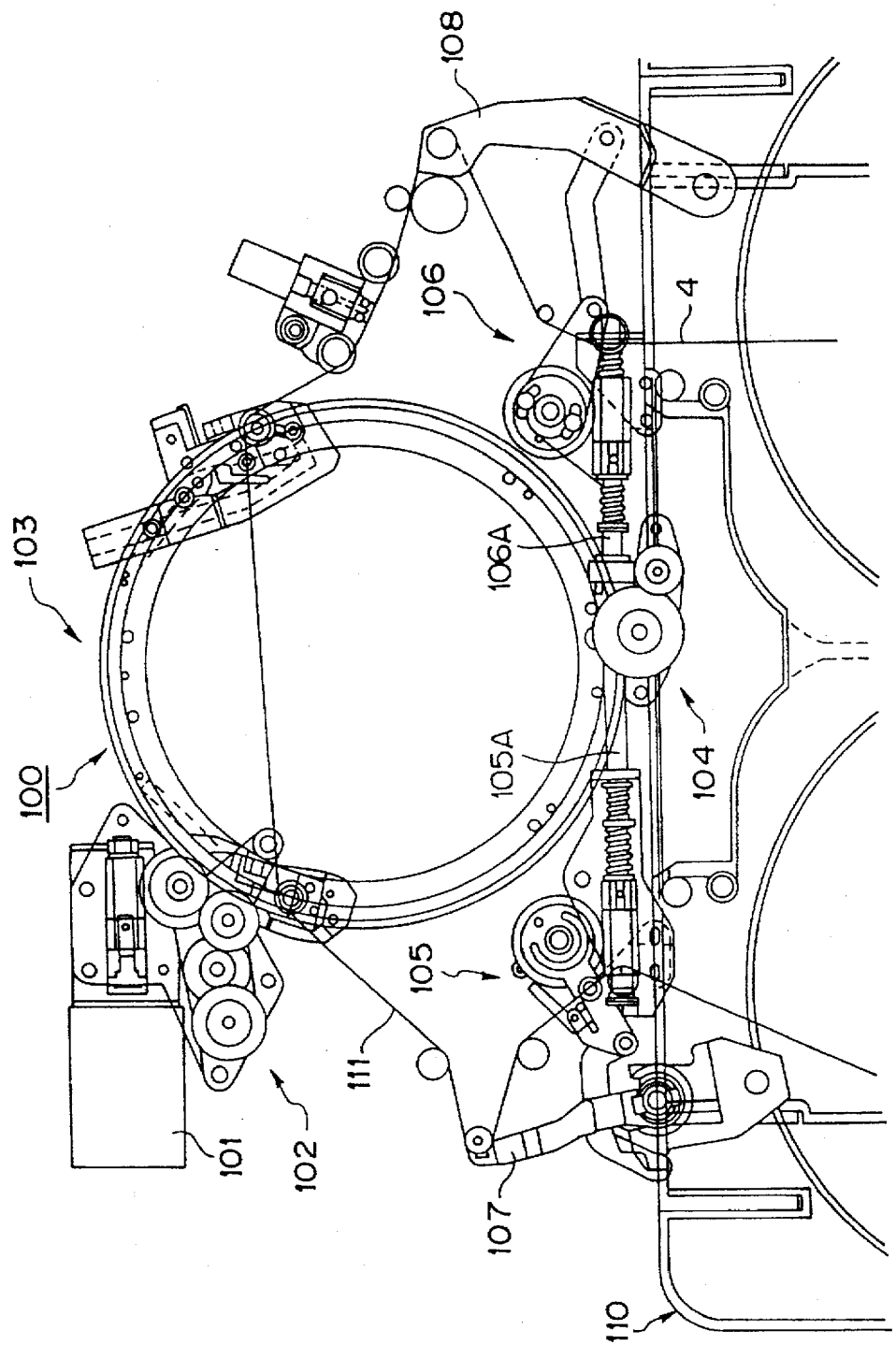
FIG. 1 is a plan view showing a conventional loading apparatus.
Figure 2:
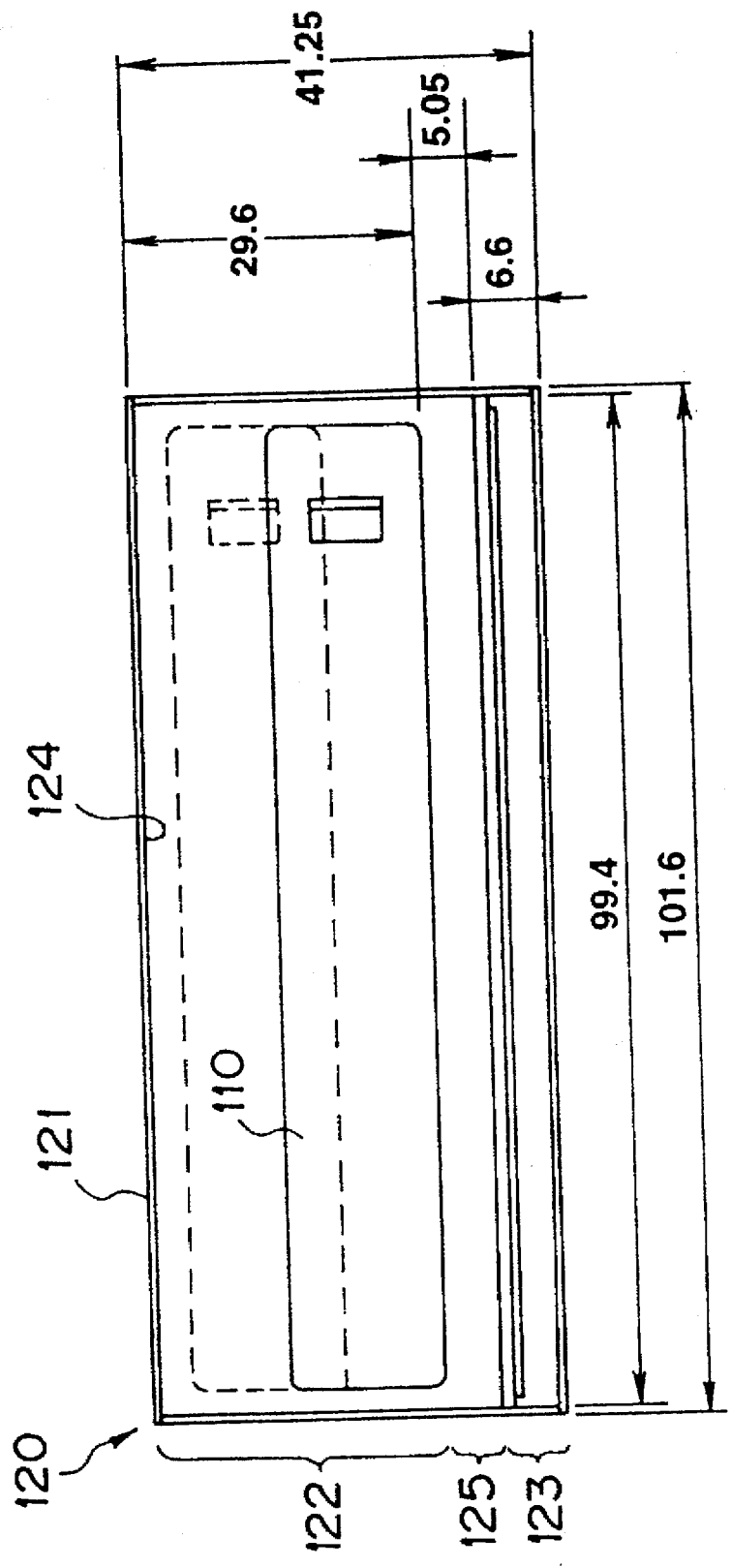
FIG. 2 is a front view showing a casing of a video tape recorder.
Figure 3:
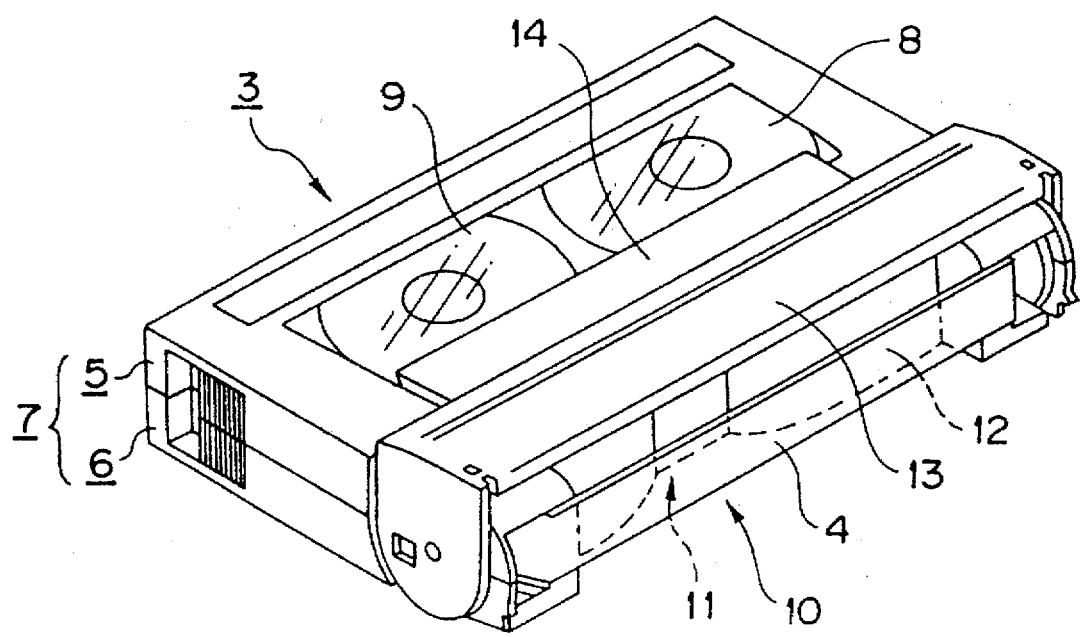
FIG. 3 is a perspective view showing a tape cartridge employed in a loading device embodying the present invention.

Referring to the drawings, preferred embodiments of the present invention will be explained in detail. A loading device 1 according to an embodiment of the present invention is provided within the inside of a video tape recorder 3 in which is loaded a video tape cassette 2. The video tape cassette 2, loaded in the video tape recorder 3, has enclosed therein a magnetic tape 4 having a tape width of 8 mm, as shown in FIG. 3. The video tape cassette 2 is comprised of a main cassette body portion 7 made up of an upper cassette half 5 and a lower cassette half 6 connected to each other by plural set screws, not shown. The cassette halves 5, 6 are rectangular in shape and molded from synthetic resin. Within the inside of the main cassette body portion 7 are rotatably mounted a pair of tape reels, that is a tape supply reel 8 an a tape take-up reel 9, which are arrayed side-by-side in the longitudinal direction and around which is placed the magnetic tape 4.

The main cassette body portion 7 has its front side 10 opened along its substantially entire width. In continuation to this front side 10, there is formed a substantially recessed tape lead-out portion 11 via which is intruded a portion of the loading device provided in the video tape recorder 3. The inner space of the cassette main body portion 7, in which are rotatably mounted the tape supply reel 8 and the tape take-up reel 8, and the tape lead-out portion 11, are separated from each other by a partition 12.

In the cassette main body portion 7, there is rotatably mounted a front wall 13 closing the opened front side 10. On the inner surface of the front lid 13 is rotatably mounted a rear lid member 14 closing the front open portion of the upper cassette half 3.

Consequently, with the front lid 13 and the rear lid member 14 rotated to open the front side 10 of the cassette main body portion 7, part of the loading device of the video cassette 2 is intruded into the tape lead-out portion 11 for pulling out the magnetic tape 4 outwards for effectuating a pre-set loading operation.

Figure 4:
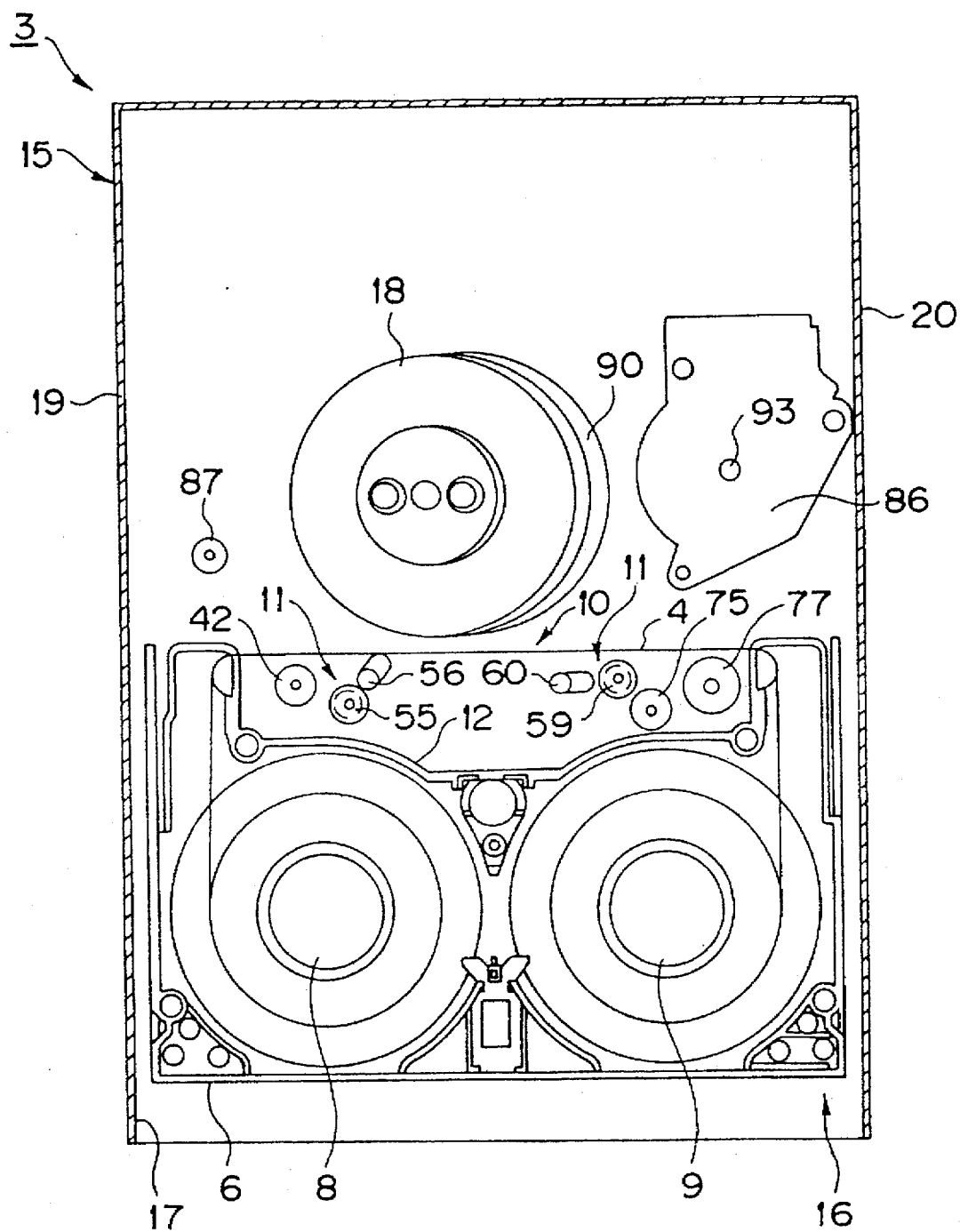
FIG. 4 is a horizontal cross-sectional view showing a video tape recorder in which is installed the loading device embodying the present invention.

Within the inside of the casing 15 of the video tape recorder 3 is mounted a cassette container 16 within which is mounted a drum-shaped magnetic head 18 for recording or reading out data signals from the magnetic tape 4, as shown in FIG. 4. The drum-shaped magnetic head 18 is positioned at a mid region of the cassette container 16 facing a cassette insertion aperture 17 via which is introduced the video cassette 2. The video tape recorder 3 is well-known and description of other components is omitted for clarity.

Figure 5:
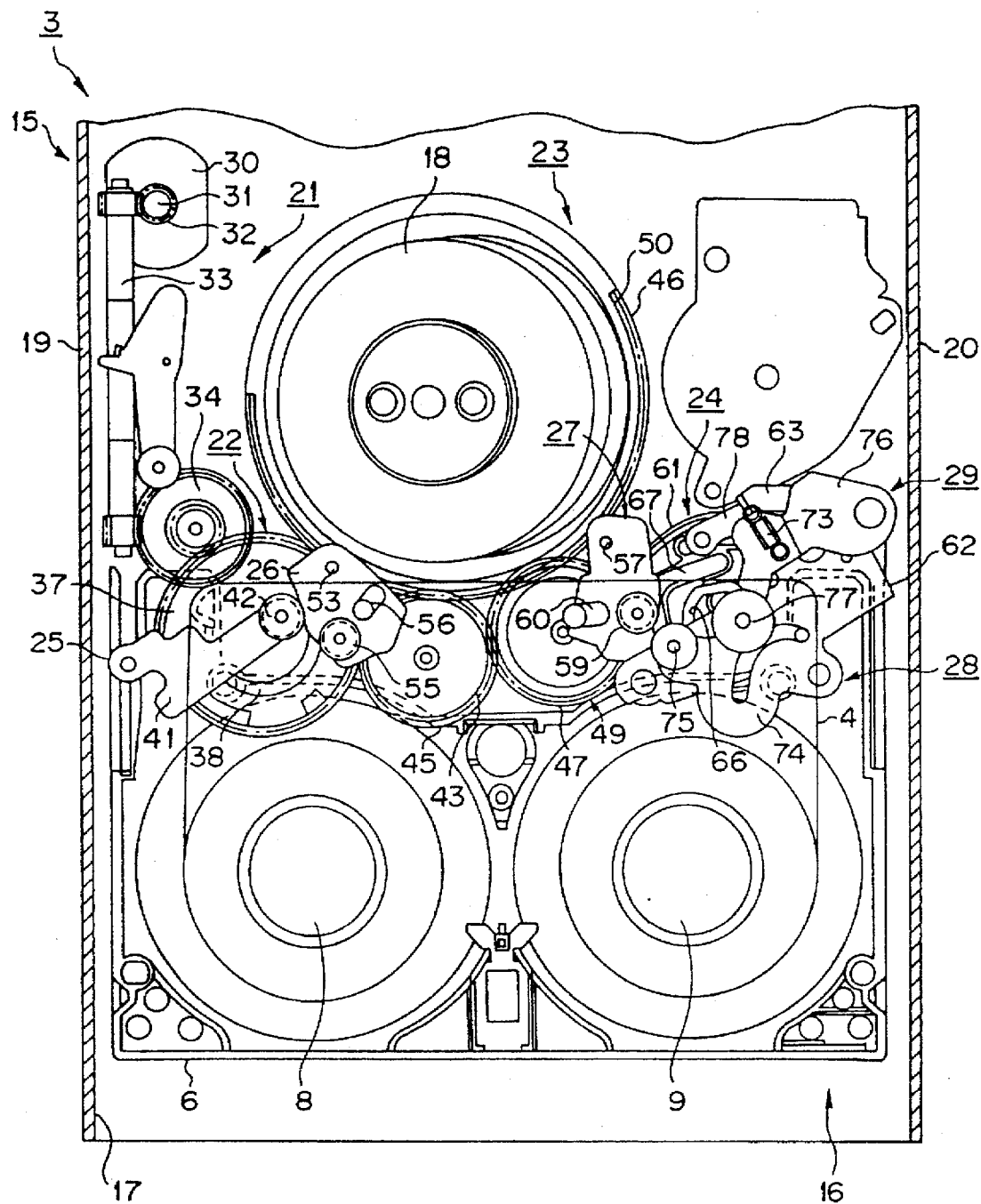
FIG. 5 is a partial horizontal cross-sectional view showing the loading device embodying the present invention.

The loading device 1 is housed within the loading device housing space of the video tape recorder 3, as shown in FIGS. 5 to 20. The loading device 1 includes a driving unit 21 having a driving motor 30, a first transmission unit 22 driven by the driving unit 21, a second transmission unit 23 driven by the first transmission unit 22 and a third transmission unit 24 driven by this second transmission unit 23, as shown in FIG. 5. The loading device 1 further includes a first magnetic tape actuating unit 25 moved by the first transmission unit 22, second magnetic tape actuating units 26, 27 moved by the second transmission unit 23, and third magnetic tape actuating units 28, 29 moved by the third transmission unit 24.

The driving unit 21 is mounted on a side plate 19 within the inside of the casing 15 of the video tape recorder 3, as shown in FIG. 5. The driving unit 21 includes a driving motor 30, having a driving shaft 32 mounted on a driving shaft 31, a worm shaft 33 having its one end engaged with a driving gear 32 of the driving motor 30 and a worm wheel 34 engaged with the other end of the worm shaft 33.

Figure 6:
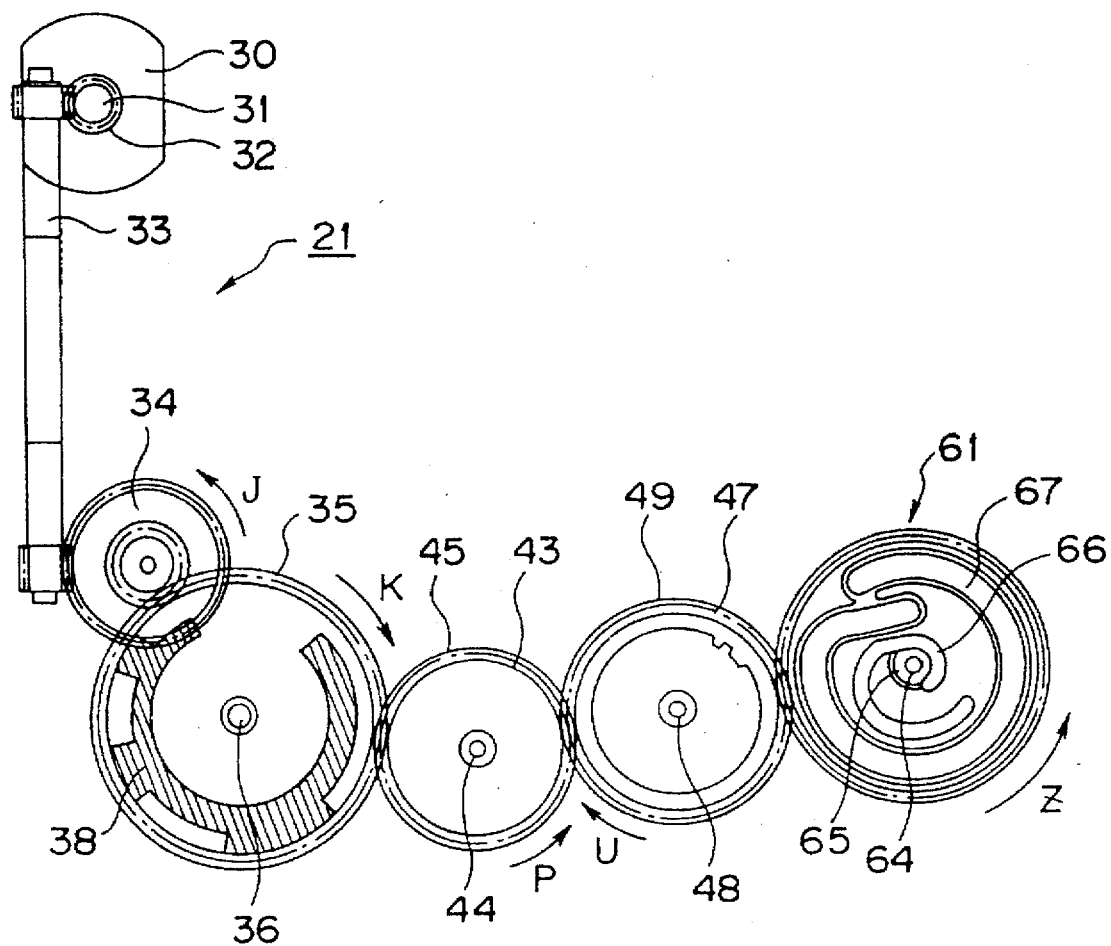
FIG. 6 is a plan view showing the state of meshing of gears constituting the loading device shown in FIG. 5.
Figure 7:
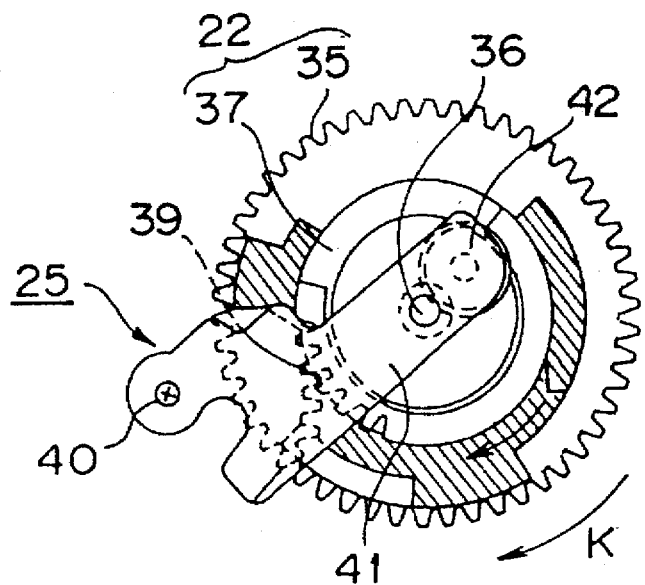
FIG. 7 is a plan view showing a first transmission unit and a first magnetic tape actuating unit constituting the loading device shown in FIG. 5.

The first transmission unit 22 is arranged on a video tape cassette inserting side of the driving unit 21. The first transmission unit 22 includes a lower arm driving gear 35 engaged with the worm wheel 34, as shown in FIG. 6, and an upper arm driving gear 37 integrally stacked by a common pivot shaft 36 on a chassis 86 with the lower arm driving gear 35, as shown in FIG. 7. On the lower arm driving gear 35 is mounted a position detection plate 38 for detecting the rotational position of the lower arm driving gear 37 by an optical sensor, not shown. The driving positions of the loading device 1 for various modes, such as ejection, stop or search, of the video tape recorder, are detected by the position detection plate 38 and the optical sensor.

Figure 8:
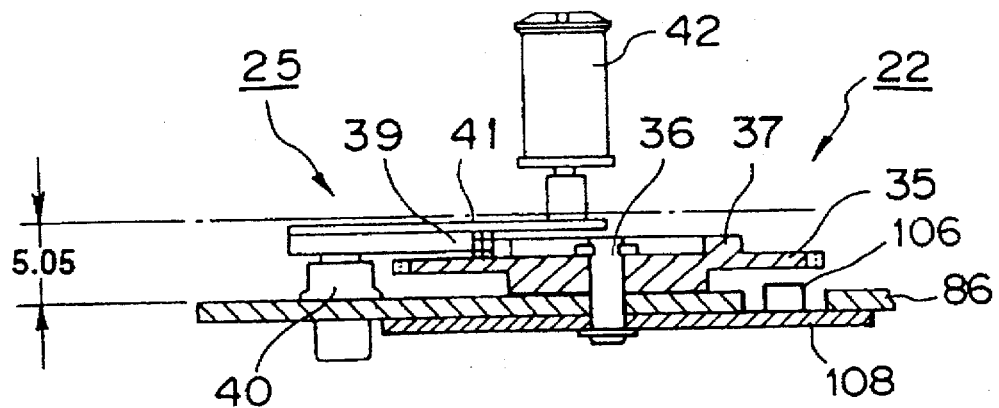
FIG. 8 is a longitudinal cross-sectional view showing the first transmission unit and the first magnetic tape actuating unit.

The magnetic tape actuating unit 25 is positioned on the first transmission unit 22, as shown in FIGS. 7 and 8. The first magnetic tape actuating unit 25 includes a substantially sector-shaped arm gear 39, engaged with the upper arm driving gear 37, a rectangular arm 41 mounted on the arm gear 39 by a common pivot shaft 40 so that one end of the arm 41 is overlapped with the arm gear 39, and a substantially columnar-shaped first movement tape guide 42 set upright on the opposite end of the arm 40. On the lower surface of the chassis 86 is secured a substrate 108 carrying sa reflection type optical sensor 106 as later explained.

Figure 9:
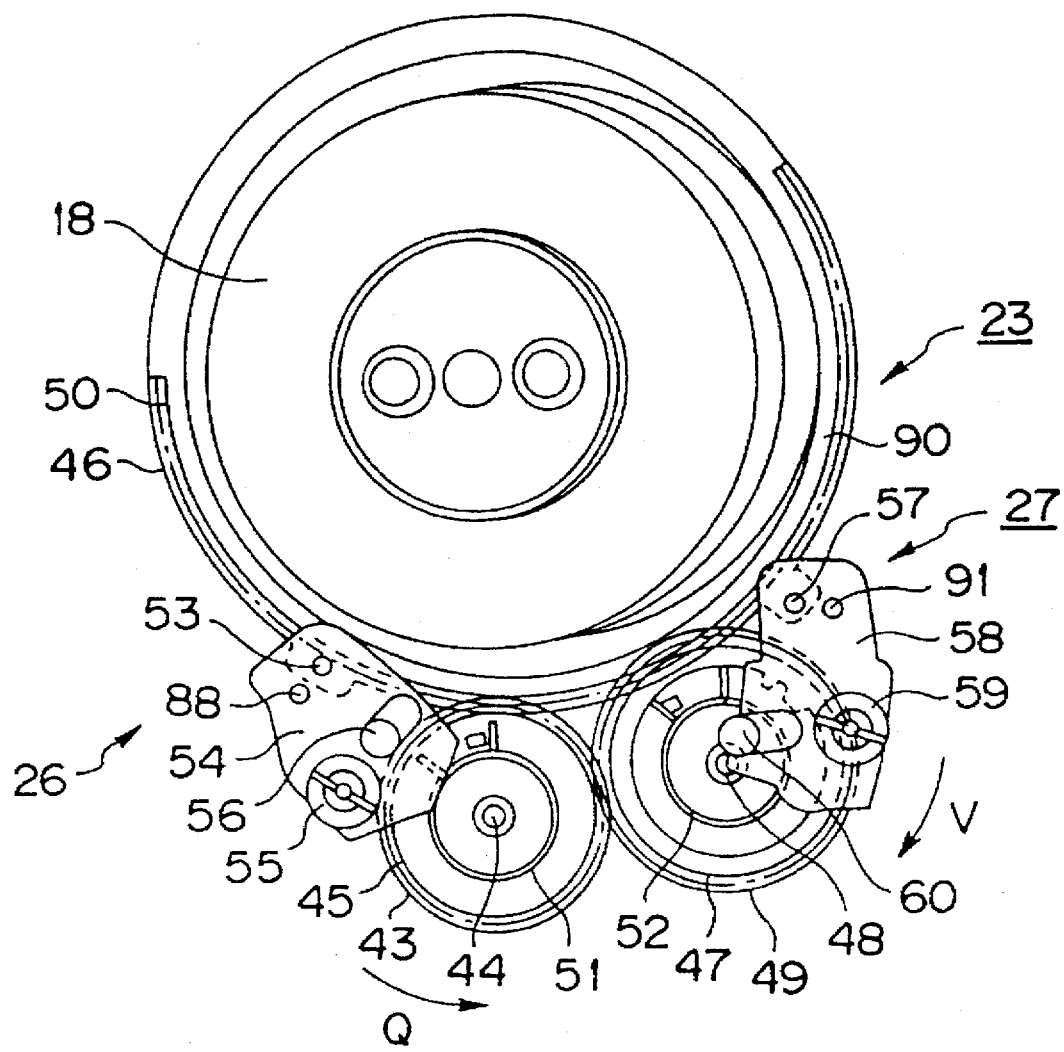
FIG. 9 is a plan view showing a second transmission unit and a second magnetic tape actuating unit constituting the loading device shown in FIG. 5.
Figure 10:
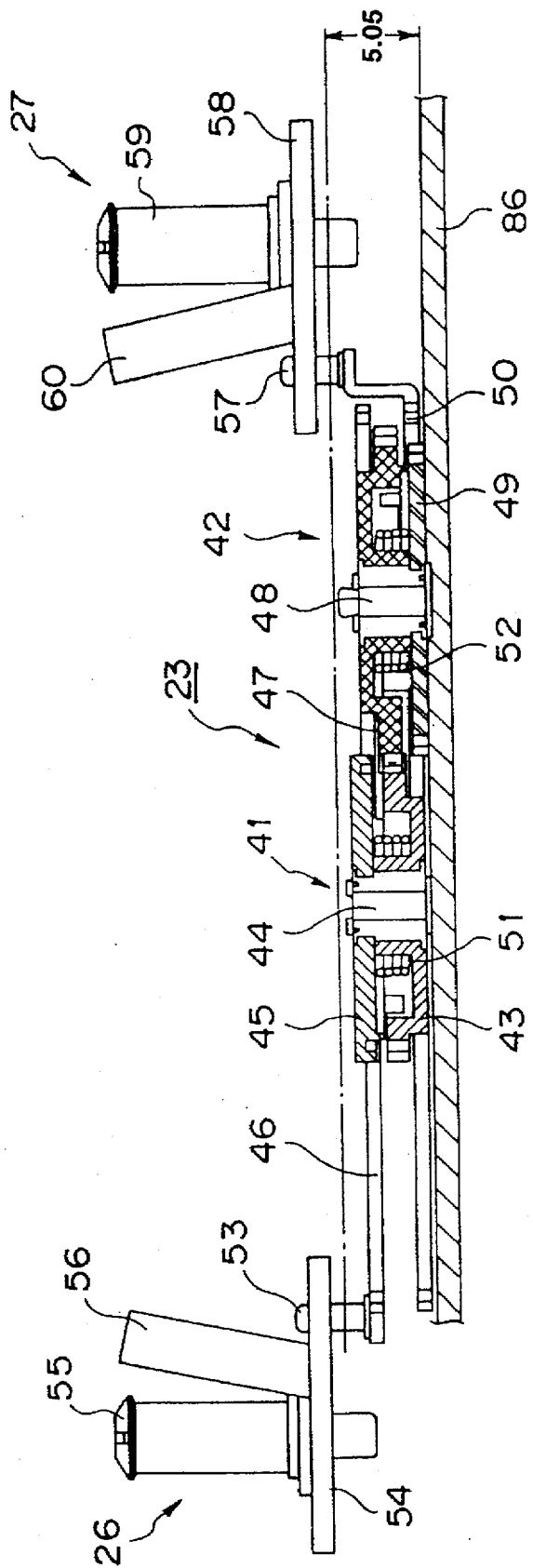
FIG. 10 is a transverse cross-sectional view showing the second transmission unit and the second magnetic tape actuating unit.

The second transmission unit 23 is arranged on the opposite side of the first transmission unit 22 on the video tape cassette inserting side of the drum-shaped magnetic head 18. The second transmission unit 23 includes a lower ring driving gear 43, meshing with the lower arm driving gear 35, a first upper ring driving gear 45, arranged on the first lower ring driving gear 43 by a common pivot shaft 44, and a first ring gear 46 meshing with the first upper ring driving gear 45, as shown in FIGS. 9 and 10. The second transmission unit 23 also includes a second upper ring driving gear 47 engaged with the first lower ring driving gear 43, a second upper ring driving gear 47 engaged with the first lower ring driving gear 43, a lower ring driving gear 49 mounted on the second upper ring driving gear 47 by a common pivot shaft 48 and a second ring gear 50 engaged with the second lower ring driving gear 49.

Between the first ring driving gear 43 and the first upper ring driving gear 45 is mounted a first coil spring 51, as shown in FIGS. 9 and 10. The first coil spring 51 has its one end supported by the first lower driving gear 43 while having its other end supported by the first upper ring driving gear 45. The first ring gear 46 is shaped as a ring having an inside diameter larger than the outside diameter of the drum-shaped magnetic head 18, and is mounted below the drum-shaped magnetic head 18 along its circumference, as shown in FIG. 9.

Between the upper ring gear 47 and the second ring driving gear 49 is mounted a second coil spring 52, as shown in FIGS. 7 and 8. The first coil spring 52 has its one end supported by the second upper ring driving gear 47, while having its other end supported by the second lower ring driving gear 49. The second ring gear 50 has a diameter substantially equal to that of the first ring gear 46, and is mounted by a common pivot shaft on the first ring gear 46, as shown in FIG. 7.

The second magnetic tape actuating unit 26 is arranged on the second transmission unit 23, as shown in FIGS. 9 and 10.

The second magnetic tape actuating unit 26 includes a first coaster 54 rotatably supported on a pivot shaft 53 set upright on the outer rim of the first ring gear 46, a substantially columnar-shaped second movement tape guide 55 set upright on the first coaster 54 and a substantially columnar-shaped third movement tape guide 56 set on the first coaster 54 with a tilt towards the drum-shaped magnetic tape 18.

The second magnetic tape actuating unit 27 is arranged on the second transmission unit 23, as shown in FIGS. 9 and 10. The second magnetic tape actuating unit 27 includes a second coaster 58, rotatably supported by a pivot shaft 57 set upright on the outer rim of the second ring gear 50, a substantially columnar-shaped fourth movement tape guide 59, set upright on the second coaster 58, and a substantially columnar-shaped fifth movement tape guide 60 mounted on the second coaster 58 with a tilt towards the drum-shaped magnetic head 18.

The second transmission unit 24 is mounted on the opposite side of the second transmission unit 23 towards the opposite side plate 20 within the inside of the casing 15. The third transmission unit 24 includes a cam gear 61, engaged with the second upper ring driving gear 47, a driving lever 62 engaged with the cam gear 61 and a driving arm 63 engaged with the driving gear 62.

The cam gear 61 has a first cam groove 66 extending along the periphery of a pivot hole 65 supported by a pivot shaft 64 and a second cam groove 67 extending along the periphery of the first cam groove 66, as shown in FIG. 6. The first cam groove 66 is formed substantially spirally for substantially one turn from between the outer rim of the cam wheel 61 and the pivot 64 to near the pivot hole 65. The second cam groove 67 is formed substantially spirally for substantially one turn from the outer periphery of the cam gear 61 to near the end of the first cam groove 66.

Figure 11:
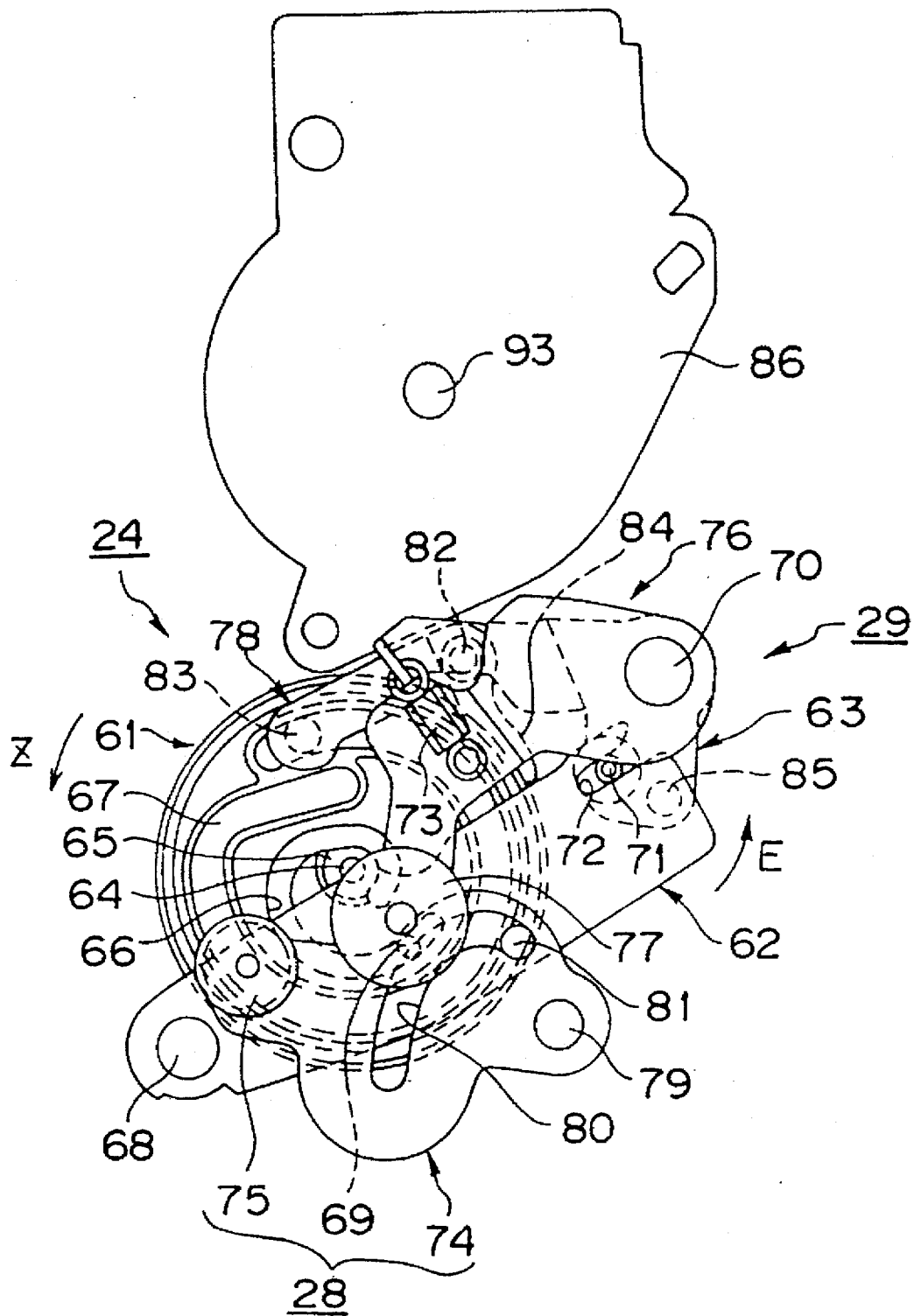
FIG. 11 is a plan view showing a third transmission unit and a third magnetic tape actuating unit constituting the loading device shown in FIG. 5.
Figure 13:
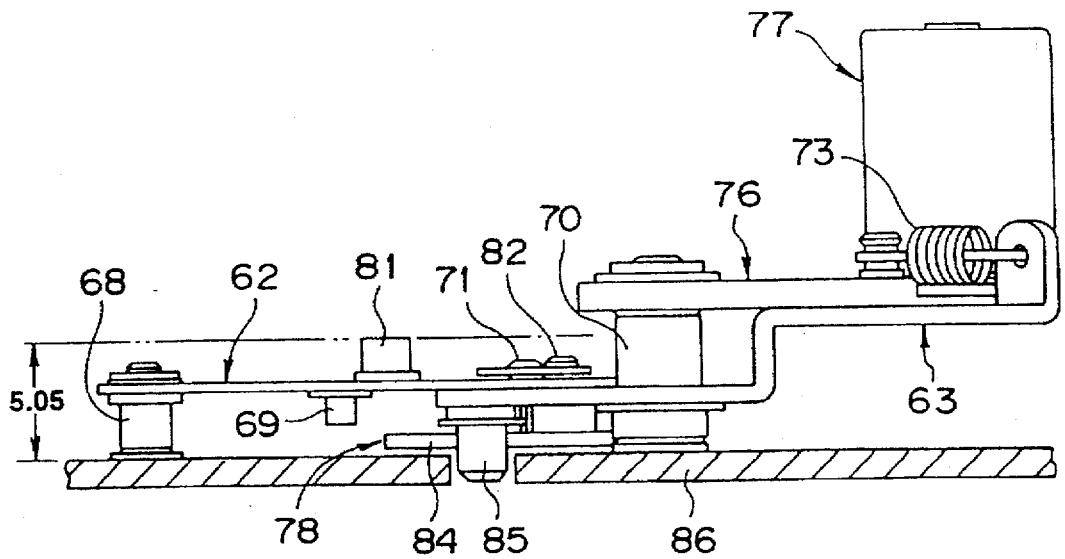
FIG. 13 is another partial transverse cross-sectional view showing the third transmission unit and the third magnetic tape actuating unit.

The driving arm 63 is substantially inverted L shaped as shown in FIG. 11 and has its mid portion supported for rotation about a pivot shaft 70 set upright on the chassis 86. On one end of the driving arm 63 is set upright a guide pin 71, as shown in FIG. 11. This guide pin 71 is inserted into a guide groove 72 formed at the other end of the driving lever 62. On the opposite end of the driving arm 63 is mounted one end of a coil spring 73, as shown in FIG. 13.

Figure 12:
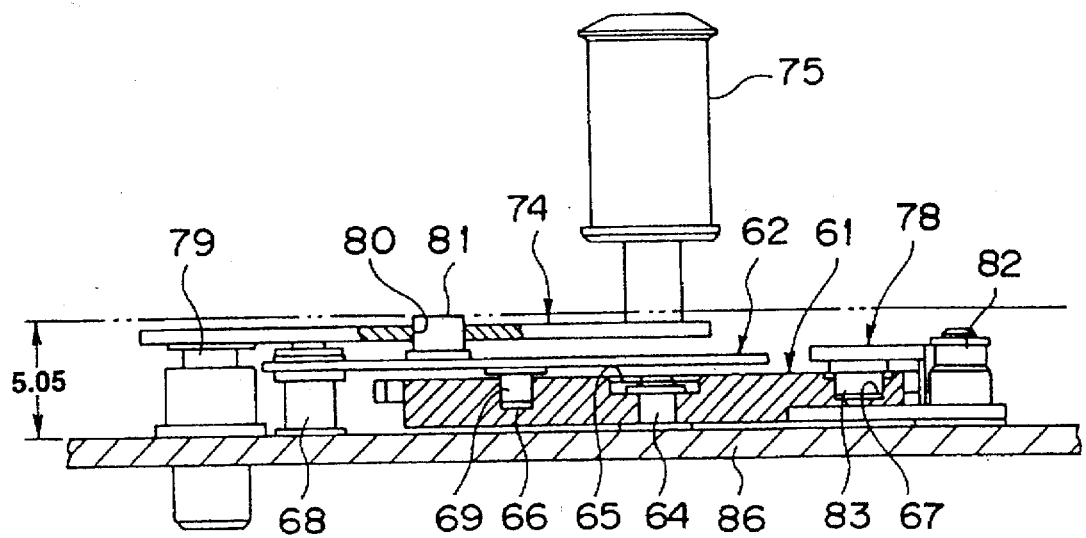
FIG. 12 is a partial transverse cross-sectional view showing the third transmission unit and the third magnetic tape actuating unit.

The third magnetic tape actuating unit 28 is arranged on an upper portion of the third transmission unit 24, as shown in FIG. 11. The third magnetic tape actuating unit 28 includes a tape guide arm 74, engaged with the driving lever 62, and a substantially columnar-shaped sixth movement tape guide 75 set upright on the distal end of the tape guide arm 74. The tape guide arm 74 has its one end rotatably supported by a pivot shaft 79 set upright n the chassis 86, as shown in FIG. 12. In the tape guide arm 74 is formed a substantially J-shaped cam groove 80 for extending from a longitudinally mid portion thereof to near the pivot shaft, as shown in FIG. 11. In the cam groove 80 of the tape guide arm 74 is inserted a second cam follower 81 set upright substantially at a mid portion of the driving lever 62, as shown in FIG. 12.

The third magnetic tape actuating unit 29 is arranged on the third transmission unit 24, as shown in FIG. 11. The third magnetic tape actuating unit 29 includes a substantially inverted U shaped pinch roll arm 76 arranged by a common pivot shaft 70 on the driving arm 63, a pinch roll 77 rotatably mounted on the distal end of the pinch roll arm 76 and a substantially inverted L-shaped thrusting arm 78 engaged with the cam gear 61. The opposite end of the coil spring 73, having its one end mounted on the driving arm 63, is mounted at a mid portion of the pinch roll arm 76, as shown in FIG. 11. The thrusting arm 78 has its mid portion rotatably supported by a pivot shaft 82 set upright on the chassis 86, as shown in FIG. 12. On one end of the thrusting arm 78 is set upright a cam follower 83 which is inserted into a second cam groove 67 of the cam gear 61, as shown in FIG. 12. On the opposite end of the thrusting arm 78 is formed a thrusting portion 84 which is thrust against or released from a receiving pin 85 set upright on one end of the driving arm 63, as shown in FIG. 13.

With the above-described structure of the loading device 1, if the video tape cassette 2 is loaded into the cassette container 16 of the video tape recorder 3, as shown in FIG. 4, a driving signal is issued by a position detection unit, not shown, for starting the rotation of the driving motor 30 of the driving unit 21, as shown in FIG. 5.

If the driving motor 30 of the driving unit 21 is run in rotation, the worm shaft 33 is run in rotation for rotating the worm wheel 34 counterclockwise as indicated by arrow J as shown in FIG. 6. The lower arm driving unit 35 of the first transmission unit 22 is rotated clockwise as indicated by arrow K in FIG. 6 by rotation of the worm wheel 34. With such rotation of the lower arm driving gear 35, the upper arm driving gear 37 is rotated clockwise as indicated by arrow L in FIG. 7. By such rotation of the upper arm driving gear 37, the arm gear 34 is rotated counterclockwise as indicated by arrow M in FIG. 14. With such rotation of the arm gear 34, the associated arm is rotated counterclockwise as indicated by arrow N in FIG. 14.

Figure 15:
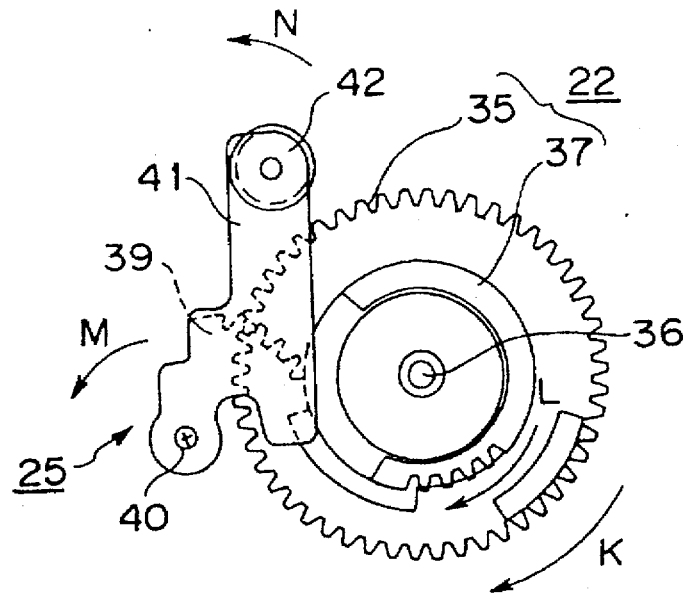
FIG. 15 is a plan view of the first transmission unit and the first magnetic tape actuating unit showing the state of completion of movement of the first movement tape guide.
Figure 16:
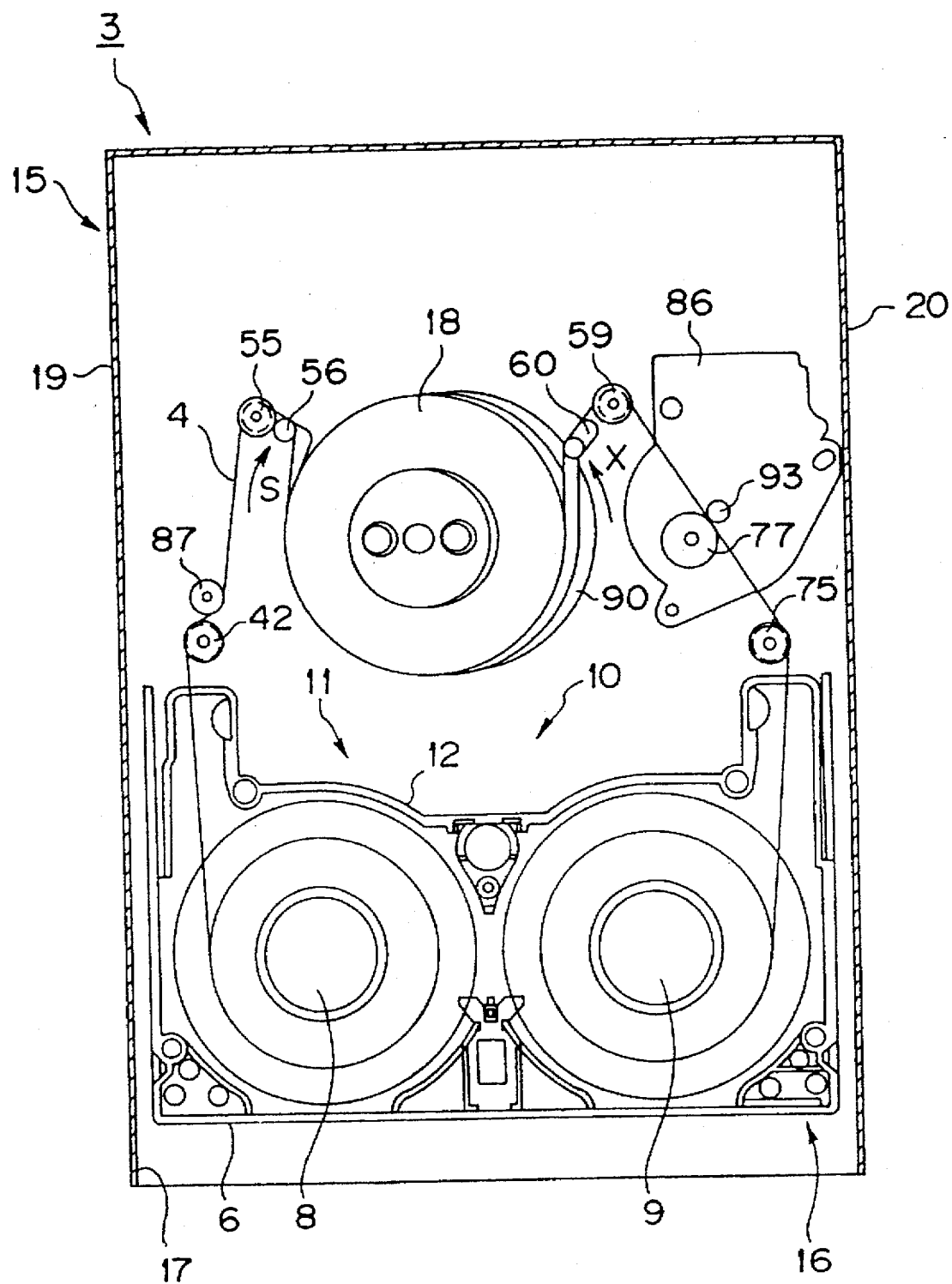
FIG. 16 is a horizontal cross-sectional view of a video tape recorder showing the state of completion of movement of respective movement tape guides and the pinch roll of the loading device of FIG. 5.
Figure 17:
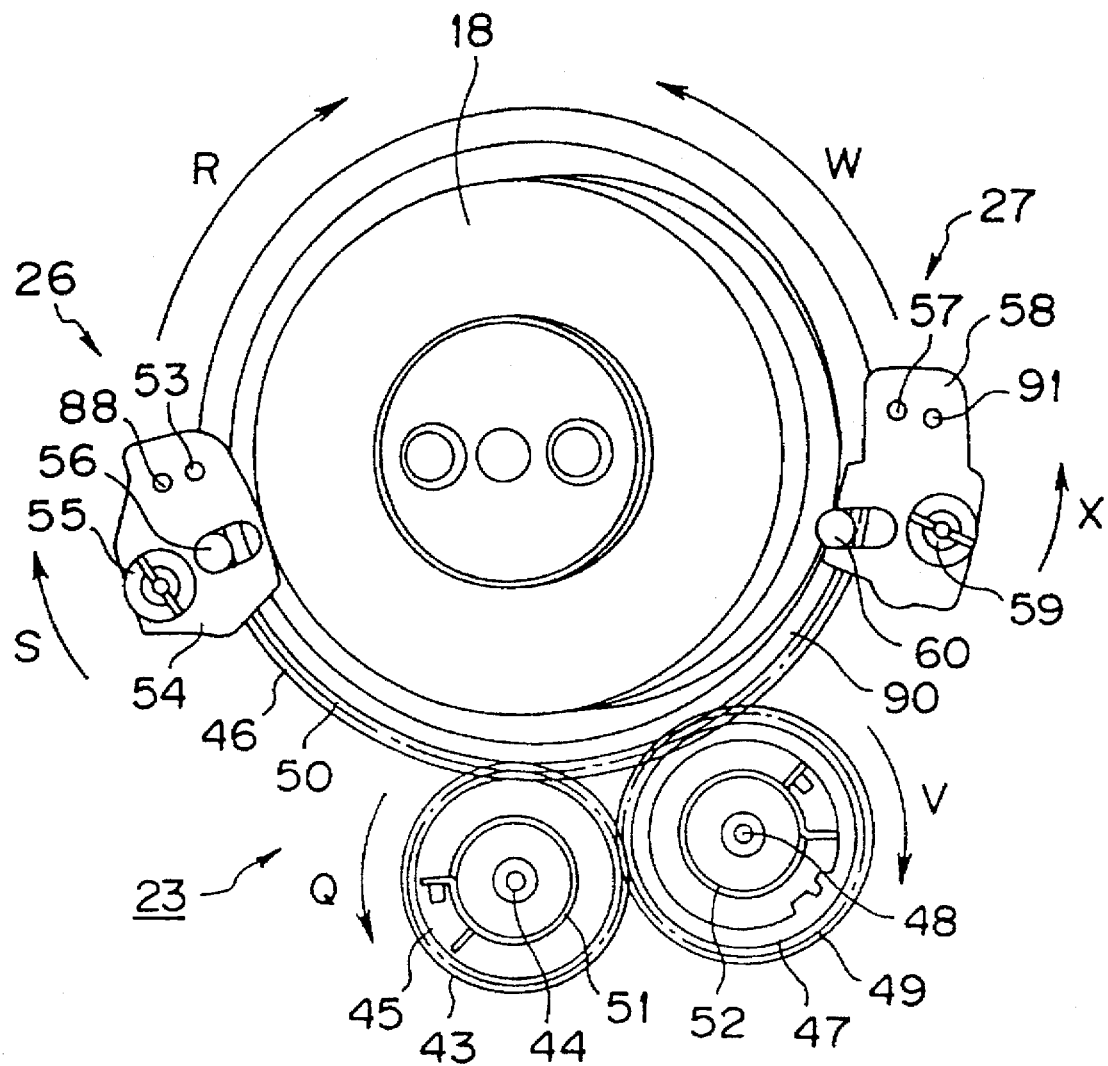
FIG. 17 is a plan view of the second transmission unit and the second magnetic tape actuating unit showing the state of movement of second to fifth movement tape guides.

Thus the first tape guide 42 pulls out the magnetic tape 4 from the tape lead-out portion 11 of the video tape cassette 2 as far as the stationary tape guide 87 set upright on the chassis 19 within the casing 15, as shown in FIG. 16. The first tape guide 42 is rotated to an inner portion within the casing 15 facing the cassette inserting aperture 17, as shown in FIG. 15.

By the rotation of the lower arm driving gear 35, the lower ring driving gear 43 is rotated counterclockwise as indicated by arrow P in FIG. 6. With such rotation of the first lower ring driving gear 43, the first upper ring driving gear 45 is rotated counterclockwise as indicated by arrow Q in FIG. 9. Thus the first ring gear 46 is rotated clockwise as indicated by arrow R in FIG. 17 by rotation of the first upper ring driving gear 45. The first coaster 54 of the second magnetic tape driving unit 26 is rotated clockwise as indicated by arrow S in FIG. 17 by the rotation of the first ring gear 46.

Thus the second and third movement tape guides 55, 56 pull out the magnetic tape 4 from the tape lead-out portion 11 of the video tape cassette 2 along the periphery of the drum-shaped magnetic head 18 counterclockwise to a position corresponding to one-third of a complete rotation, as indicated by arrow S in FIG. 16. The second and third movement tape guides 55, 56 are halted by a stop 89 set upright on the chassis 86, via a stop pin 88 set upright on the coaster 54, as shown in FIG. 18, until the magnetic tape 4 is caused to bear against an outer peripheral sliding surface 90 of the drum-shaped magnetic head 18, as shown in FIG. 16.

Figure 18:
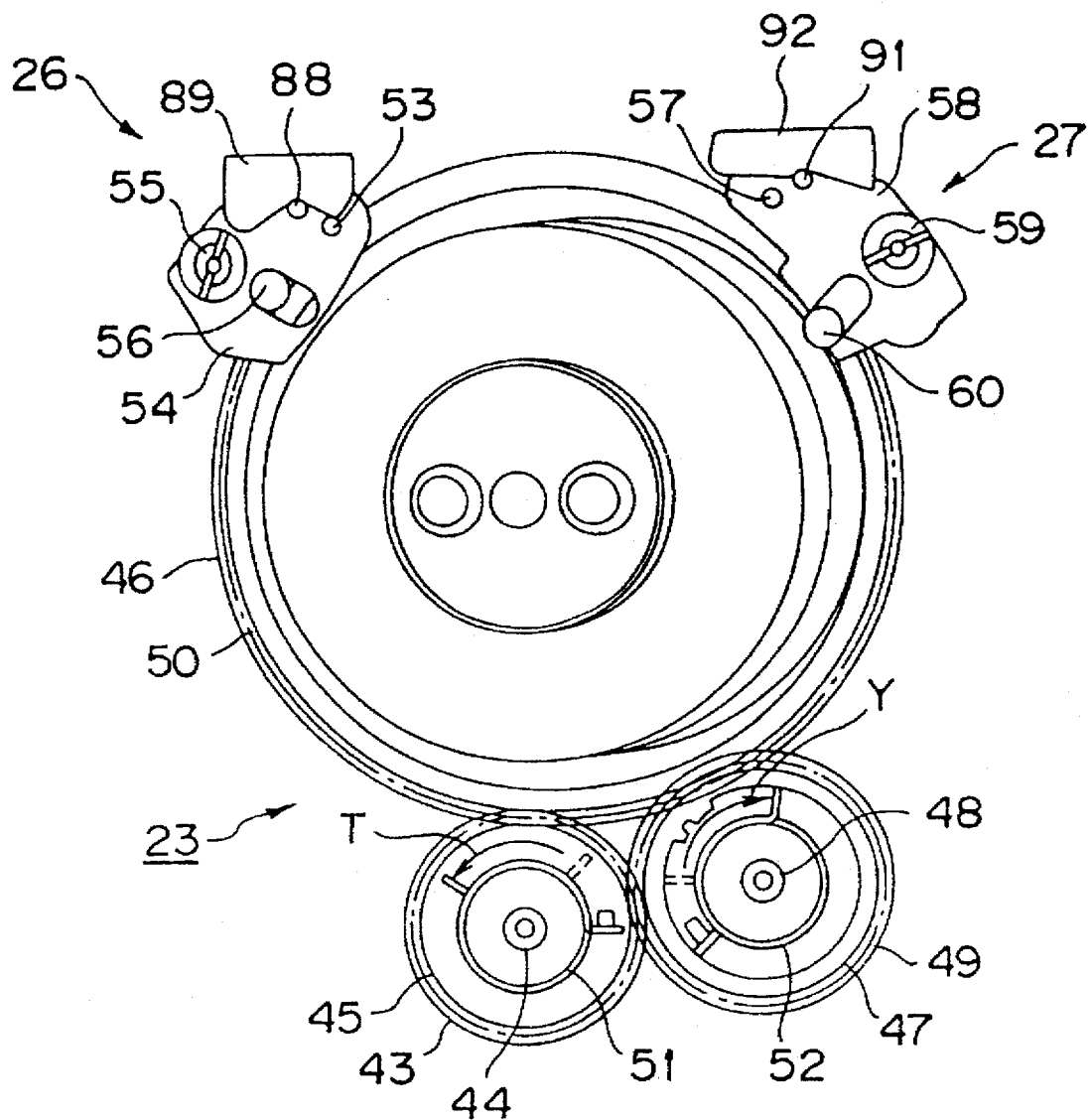
FIG. 18 is a plan view of the second transmission unit and the second magnetic tape actuating unit showing the state of completion of movement of second to fifth movement tape guides.

The first lower ring driving gear 43 is further rotated counterclockwise as indicated by arrow T in FIG. 18 for biasing the first upper ring driving gear 45 by the spring force stored in the first coil spring 51. Thus the second and third movement tape guides 55, 56 are further thrust against the stop 89 via stop pin 88 set upright on the coaster 54. The magnetic tape 4 is reliably pressed against the outer peripheral sliding surface 90 of the drum-shaped magnetic head 18 whilst a pre-set tension is applied against the magnetic tape 4.

The upper ring driving gear 47 of the second transmission unit 23 is rotated clockwise as indicated by arrow U in FIG. 6, by rotation of the first lower ring driving gear 43. With such rotation of the second upper ring driving gear 47, the second lower ring driving gear 49 is rotated clockwise as indicated by arrow V in FIG. 9. Thus, by such rotation of the second lower ring driving gear 49, the second ring gear 50 is rotated counterclockwise as indicated by arrow W in FIG. 17. By such rotation of the second ring gear 50, the second coaster 58 of the second magnetic tape actuating unit 27 is rotated counterclockwise as indicated by arrow X in FIG. 17.

Therefore, the fourth and fifth movement tape guides 59, 60 pull out the magnetic tape 4 from the tape lead-out portion 11 of the video tape cassette 2 to a position along the peripheral surface of the drum-shaped magnetic head 18 as far as a position corresponding to one-third of complete rotation in the counterclockwise direction as indicated by arrow X in FIG. 16. The fourth and fifth movement tape guides 59, 60 are halted via a stop pin 91 set upright on the coaster 58 by a stop 92 set upright on the chassis 86 for thrusting the magnetic tape 4 against the outer peripheral surface 90 of the drum-shaped magnetic head 18.

The second upper ring driving gear 47 is further rotated clockwise as indicated by arrow Y in FIG. 18 for biasing the second lower ring driving gear 49 by the spring force stored in the second coil spring 52. Thus the fourth and fifth movement tape guides 59, 60 are thrust further against the stop 92 via stop pin 91 set upright on the coaster 58, such that the magnetic tape 4 is caused to bear against the outer peripheral sliding surface 90 of the drum-shaped magnetic head 18 while a pre-set tape tension is applied to the magnetic tape 4.

By such rotation of the second upper ring driving gear 47, the third cam gear 61 of the transmission unit 24 is rotated counterclockwise as indicated by arrow Z in FIG. 6. By such rotation of the cam gear 61, the first cam follower 69 of the driving lever 62 is guided along the first cam groove 66 of the cam gear 61 so as to be rotated counterclockwise as indicated by arrow E in FIG. 11. By such rotation of the driving lever 62, the tape guide arm 74 of the third magnetic tape actuating unit 28 is rotated clockwise as indicated by arrow F in FIG. 19, with te cam follower 81 of the driving lever 62 being then guided by the cam groove 80.

Figure 20:
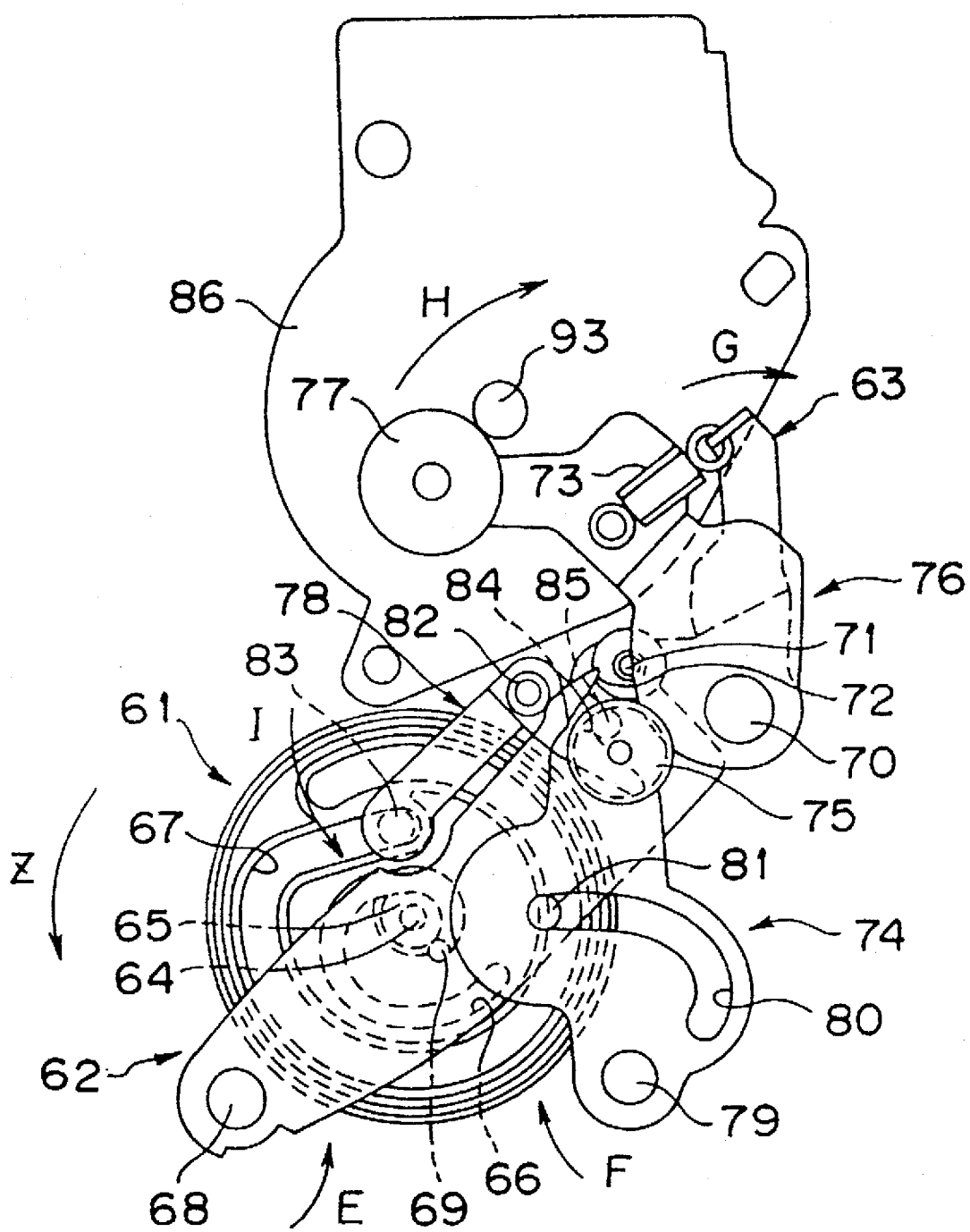
FIG. 20 is a plan view of the third transmission unit and the third magnetic tape actuating unit showing the state of completion of movement of the sixth movement tape guide and the pinch roll.

Thus the sixth tape guide 75 pulls out the magnetic tape 4 from the tape lead-out portion 11 of the video tape cassette 2 as far as the opposite side plate 20 in the inside of the casing 15, as shown in FIG. 16. The sixth tape guide 75 is rotated to an inner position in the casing 15 facing the cassette insertion aperture 17 and there halted, as shown in FIG. 20.

Figure 19:
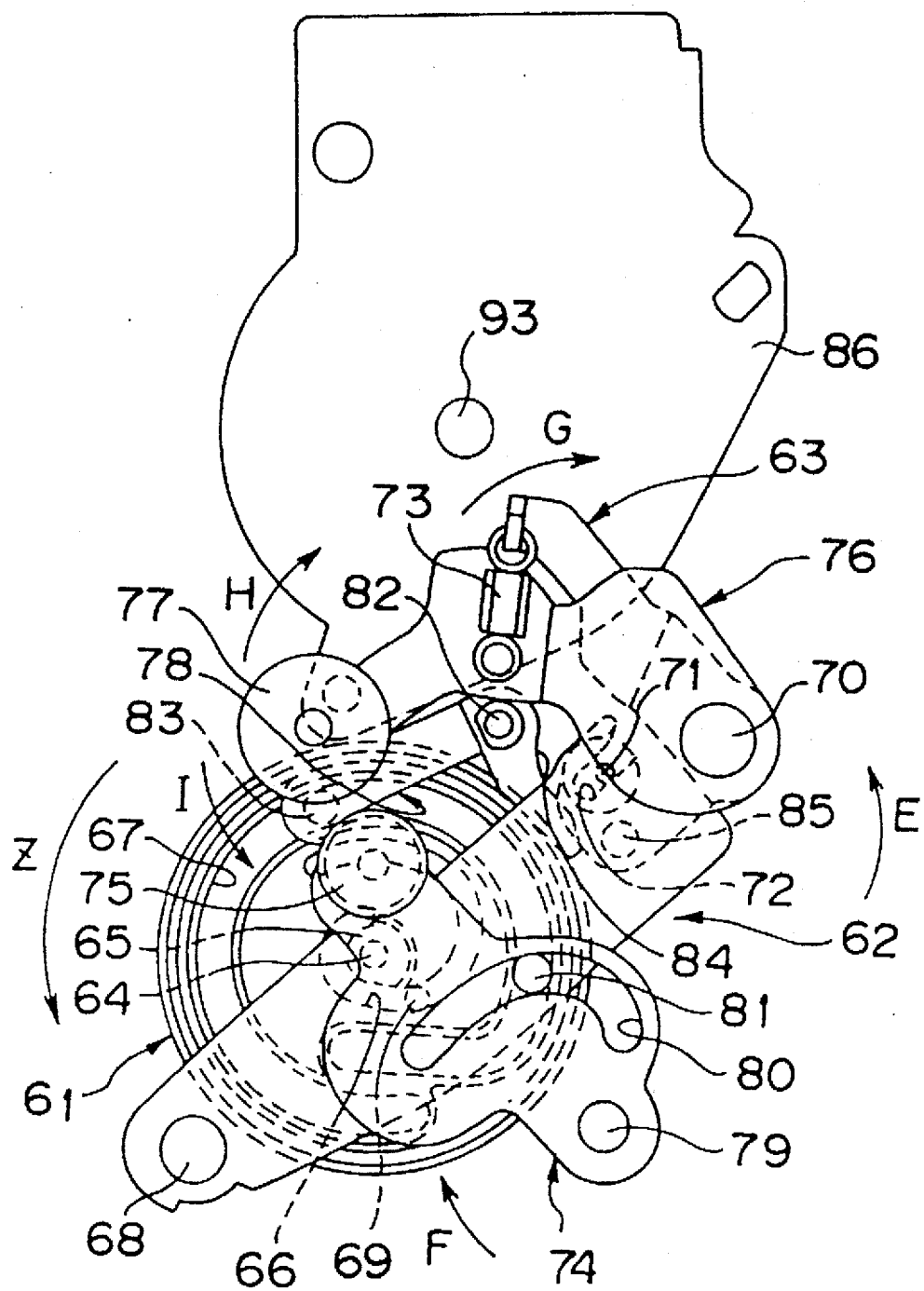
FIG. 19 is a plan view of the third transmission unit and the third magnetic tape actuating unit showing the state of movement of a sixth movement tape guide and the pinch roll.

When the driving lever 62 is rotated, the driving arm 63 of the third transmission unit 24 is rotated clockwise as indicted by arrow G in FIG. 19, with the guide pin 71 being then guided by the guide groove 72 formed in the driving lever 62. With such rotation of the driving arm 63, the pinch roll arm 76 of the third magnetic tape actuating mechanism 29 is rotated clockwise as indicated by arrow H in FIG. 19, with the pinch roll arm 76 being pulled out at a mid portion thereof by the driving arm 63 via coil spring 73.

Figure 14:
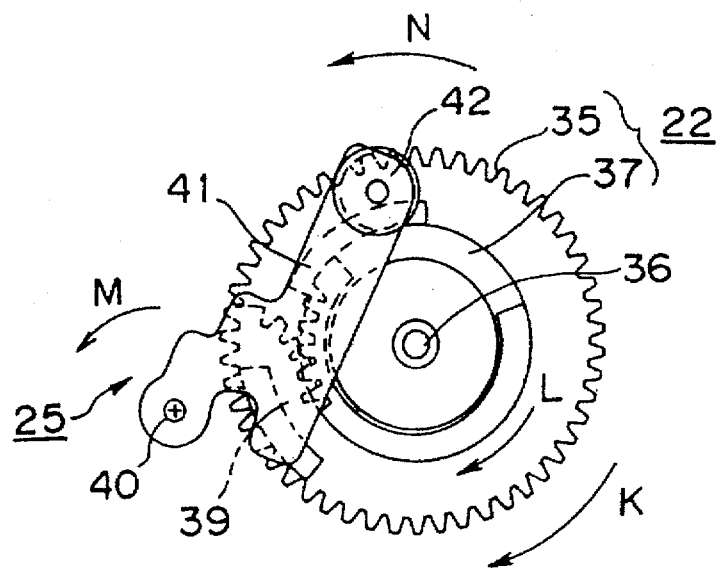
FIG. 14 is a plan view of the first transmission unit and the first magnetic tape actuating unit showing the state of movement of a first movement tape guide.

Thus the pinch roll 77 pulls out the magnetic tape 4 from the tape lead-out portion 11 of the video tape cassette 2 as far as a capstan 93 set upright on the chassis 86 towards the opposite side plate 20 of the casing 15 for thrusting the magnetic tape 4 against the outer peripheral surface of the capstan 93, as shown in FIG. 14. The pinch roll 77 is rotated as far as an inner position in the casing 15 facing the cassette inserting aperture 17, as shown in FIG. 20.

With rotation of the cam gear 61, the thrusting arm 78 is rotated counterclockwise as indicated by arrow I in FIG. 19, with the cam follower 83 being then guided by the second cam groove 67 of the cam gear 61. The thrusting portion 84 of the thrusting arm 78 is thrust against the reception pin 85 of the driving arm 63 for rotating the driving arm 63 clockwise as indicated by arrow G in FIG. 20 for rotating the pinch roll arm 76 clockwise as indicated by arrow H in FIG. 20. Thus the pinch roll 77 is further thrust against the capstan 93 under the thrusting force exerted by the thrusting arm 78 as shown in FIG. 16. The magnetic tape 4 is caused to bear reliably against the outer peripheral surface of the capstan 93 while a pre-set tape tension is applied against the magnetic tape 4.

Under this condition, the video tape recorder 3 causes the magnetic tape 4 to run along the first to sixth tape guides 42, 55, 56, 59, 60 and 75 and the pinch roll 77 of the loading device 1 at a constant velocity for rotating the drum-shaped magnetic head 18 for recording/reproducing the magnetic tape 4.

With the above-described embodiment of the loading device 1, the first to third transmission units 22, 23 and 24 are respectively provided with transmission gears by means of which the first magnetic tape actuating unit 26, second magnetic tape actuating units 26, 27 and the third magnetic tape actuating units 28, 29 are caused to pull out the magnetic tape 4. This eliminates worm shafts 105A, 106A required in the conventional device thus reducing the size of the main body portion of the loading device in order to deal with reduction in size of the video tape recorder.

Moreover, with the present loading device 1, since the spring force of the coil springs 51, 52 is stored in the coil springs 51, 52 as a result of rotation of the first lower ring gear 43 and the second upper ring gear 47 so as to be transmitted to the first upper ring gear 45 and to the second lower ring gear 49, the magnetic tape 4 can be positively contacted under pressure with the sliding surface 90 of the drum-shaped magnetic head 18 via the second magnetic tape actuating units 26, 27 which have pulled out the magnetic tape 4 and which have caused the tape thus pulled out to bear against the sliding surface 90 of the drum-shaped magnetic head 18.

In addition, with the present loading device 1, since the thrusting arm 78 thrusts the pinch roll arm 76 which has pulled out the magnetic tape 4 and has abutted the tape against the capstan 93, the magnetic tape 4 can be reliably contacted under pressure with the capstan 93 via pinch roll 77.

A specified embodiment of a mode switch, as used for the video tape recorder of the present invention, will now be explained.

Figure 21A:
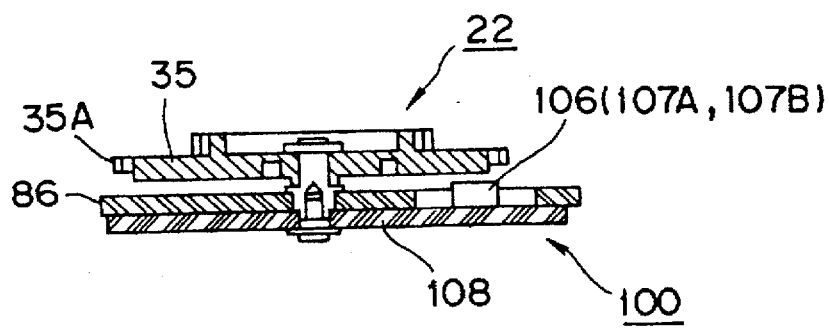

FIG. 21A shows a mode switch 100 provided with the above-described first transmission unit 22. On the perimeter of the lower arm driving gear 35 is formed a gear 35A. This gear 35A transmits rotation of the driving motor 30 so that the lower arm driving gear 35 is rotated with rotation of the driving motor 30.

Figure 21B:
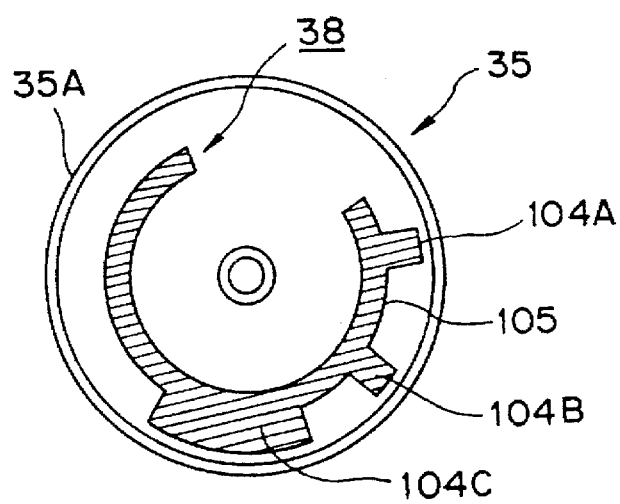
Figure 21C:
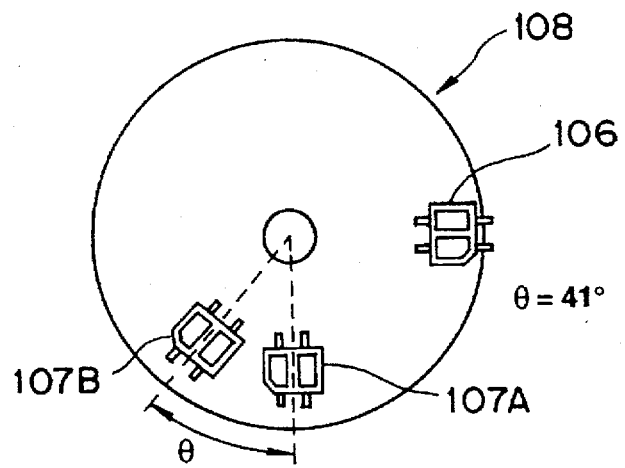

On the back surface of the lower arm driving gear 35 is mounted a position detection plate 38, as shown in FIG. 21B. This position detection plate is made up of reflective patterns 104A to 104C on the outer peripheral side and a reflective pattern 105 on the inner peripheral side. The reflective patterns 104A to 104C and 105 are silver in color for better light reflection. The reflective patterns 104A to 104C on the outer peripheral side are used for position detection, while the reflective pattern 105 on the inner peripheral side is used for generating codes corresponding to respective positions.

On the lower surface of the chassis 86 is secured the substrate 108. The upper surface of the substrate 108 carries three reflective photosensors 106, 107A and 107B. Each of the photosensors 106, 107A and 107B is made up of a light-emitting diode and a phototransistor and is configured so that the light from the light emitting diode is reflected by the reflective pattern and the reflected light is received by the phototransistor. The phototransistor 106 is mounted at a position in register with the patterns 104A to 104C on the outer rim of the gear 35. The photosensors 107A, 107B, mounted at the positions in register with the pattern 105 on the inner rim of the gear 35, are arrayed at an angular distance of 41° from each other. The photosensor 106 is used for position detection while the photosensors 107A, 107B are used for code detection.

The chassis 86 and the lower arm driving gear 35 are arranged facing each other, as shown in FIG. 21A. The lower arm driving gear 35 is mounted rotatably with respect to the chassis 86. The substrate 108 is secured to the lower surface of the chassis 86. The lower arm driving gear 35 is rotated with rotation of the driving motor 30.

Referring to FIG. 6, the worm gear 32 is mounted on the driving shaft 31 of the loading motor 30. The worm gear 32 meshes with one end of the worm shaft 33, while the worm wheel 34 meshes with the opposite end of the worm shaft 33. The worm wheel 34 also meshes with a gear 35A of the lower arm driving gear 35 constituting the mode switch 100.

Rotation of the driving motor 30 is transmitted via worm shaft 33 and worm wheel 34 to the lower arm driving gear 35 which is a part of the mode switch 100. This causes rotation of the lower arm driving gear 35. If the lower arm driving gear 35 is rotated, outputs of the reflective photosensors 106 and 107A, 107b are changed. Outputs of the reflective photosensors 106, 107A and 107B are supplied to a system controller, not shown.

An output of the reflective photosensor 106 is used for detecting a position of the lower arm driving gear 35 appropriate for code detection, while outputs of the reflective photosensor 107A, 107B are used for generating a code specifying the operating mode of the video tape recorder 3 for the detected position. If it is detected from the output of the reflective photosensor 106 that a pre-set angle of rotation of the driving gear 35 has been reached, the system controller reads out the code corresponding to such angle of rotation from the outputs of the reflective photosensors 107A and 107B.

Figure 25A:
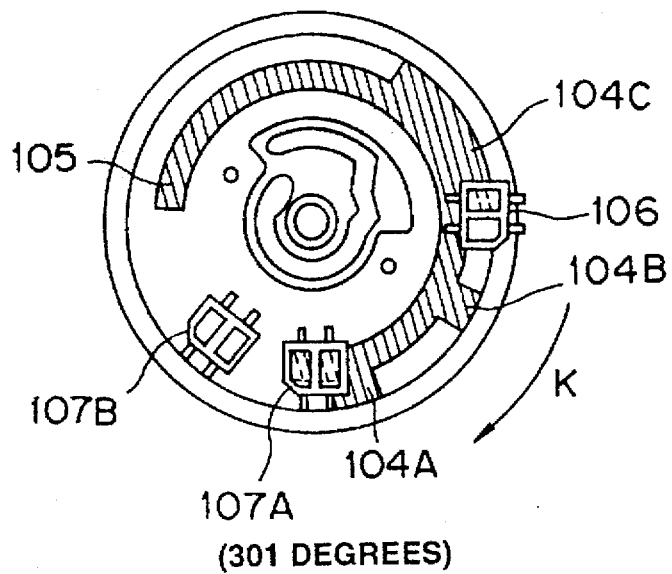
FIG. 25A and 25B are plan views illustrating the relative positions between the photo sensor and the outer rim side patterns of the mode switch according to the present invention.
Figure 25B:
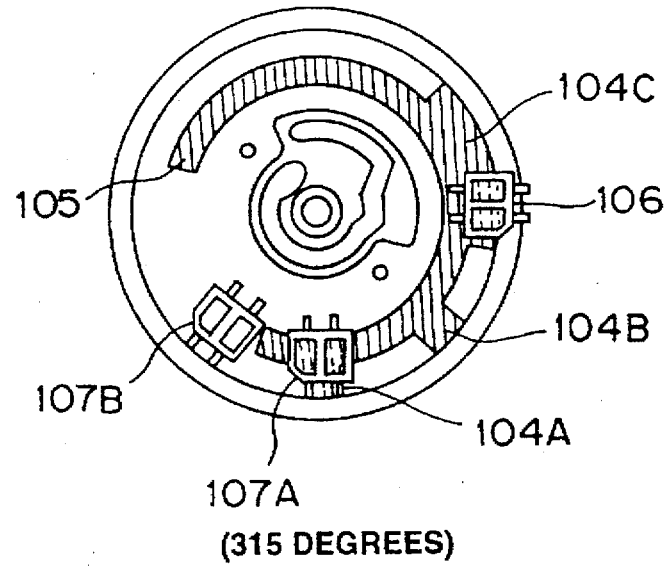
Figure 26:
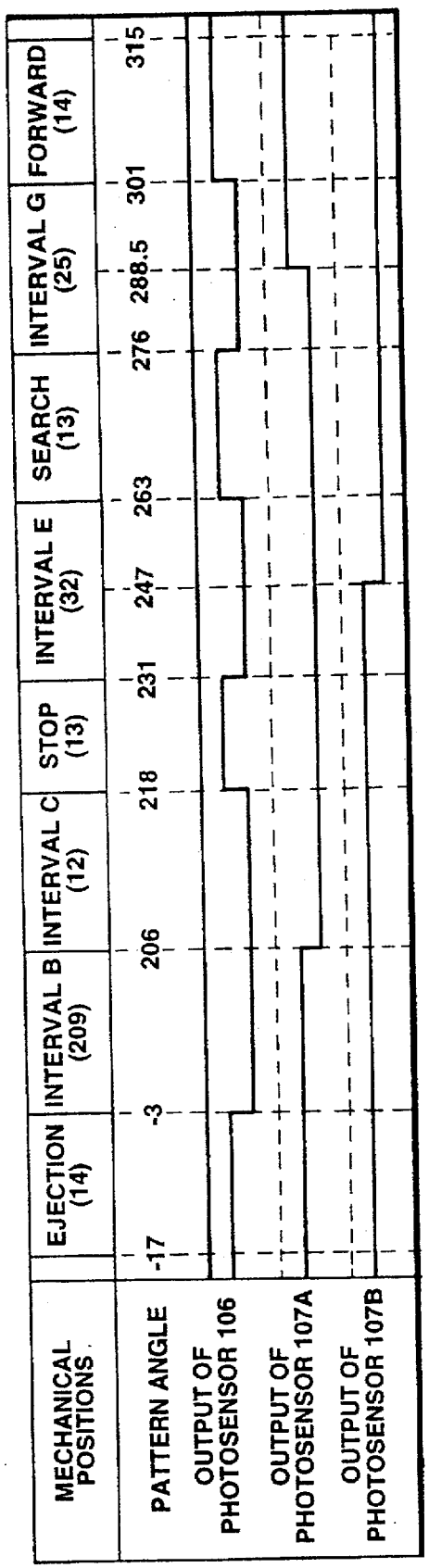
FIG. 26 is a representation of the output of the photo sensor of the mode switch for different pattern angles according to the present invention.

FIGS. 22 to 25 illustrate the relative position between the photosensor 106 and the outer rim side patterns 104A to 104C and that between the photosensors 107A, 107B and the inner rim side pattern 105 when the lower arm driving gear 35 has been rotated in a direction indicated by arrow K. FIG. 26 shows an output of the reflective photosensor 106, outputs of the reflective photosensors 107A, 107B and position codes for different pattern angles.

From an output of the reflective photosensor 106, rotation of the lower arm driving gear 35 is detected, and outputs of the reflective photosensors 107A, 107B for an "H" level of the output of the reflective photosensor 106 are stored in the system controller. If the output of the reflective photosensor 106 is at "L" level, the driving gear 35 is at an interval between the respective positions, such that outputs of the reflective photosensors 107A, 107B are invalidated.

Figure 22A:
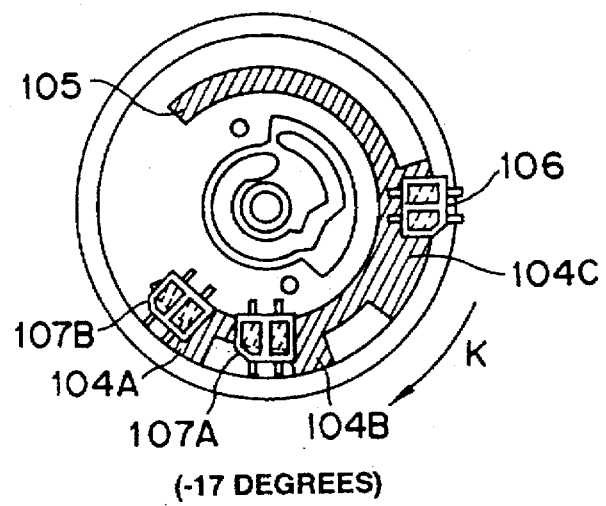
FIGS. 22A, 22B and 22C are plan views for illustrating the mode switch according to another embodiment of the mode switch according to the present invention.
Figure 22B:
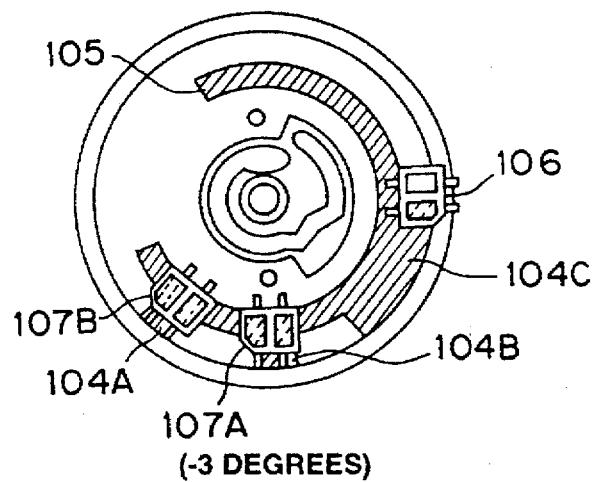

Referring to FIG. 26, if the lower arm driving gear 35 is at a position between −17° and −3°, the mechanical position is at an "eject" position. The "eject" position is a position for ejecting the magnetic tape 4. For a pattern angle between −17° and −3°, corresponding to the "eject" position, the reflective pattern C is disposed on the reflective photosensor 106, as shown in FIGS. 22A to 22B. Consequently, an output of the reflective photosensor 106 is at an "H" level. The reflective pattern 105 is disposed on the reflective photosensors 107A, 107B. Thus the outputs of the reflective photosensors 107A and 107B are both at an "H" level.

Figure 22C:
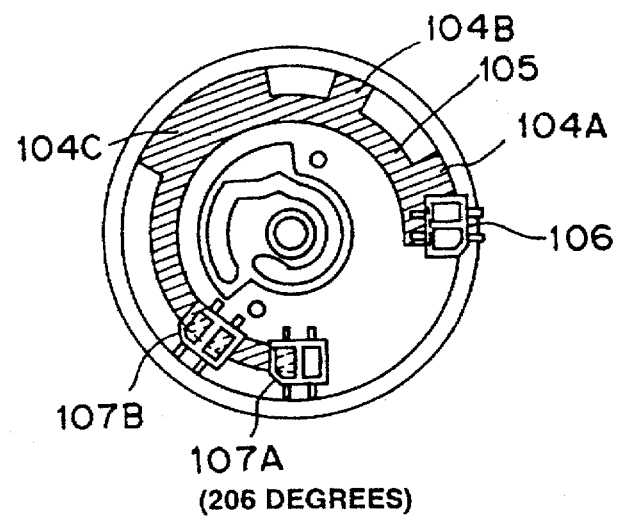

The angular interval between −3° and 206° is an "interval B" position, as shown in FIG. 26. For the angular interval of from −3° to 206°, corresponding to the "interval B" position, as shown in FIG. 22B and 22C, the reflective pattern ceases to be positioned on the reflective photosensor 106. Thus, an output of the reflective photosensor 106 as at an "L" level, as shown in FIG. 26. The reflective pattern 105 ceases to be disposed on the reflective photosensor 106, such that an output of the reflective photosensor 106 is changed to an "L" level. Since the reflective pattern 105 is positioned on the reflective photosensors 107A, 107B, outputs of the reflective photosensor 107A, 107b both are at an "H" level.

Figure 23A:
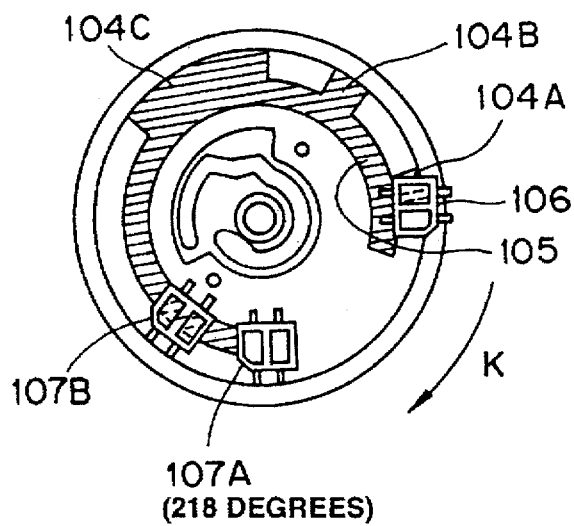
FIGS. 23A, 23B and 23C are plan views for illustrating the mode switch according to still another embodiment of the mode switch according to the present invention.

The angular interval between 206° and 218° is an "interval C" position, as shown in FIG. 26. For the angular interval of from 206° to 218°, corresponding to the "interval C" position, as shown in FIG. 22C and 23A, the reflective pattern ceases to be positioned on the reflective photosensor 106. Thus, an output of the reflective photosensor 106 as at an "L" level, as shown in FIG. 26. The reflective pattern 105 ceases to be disposed on the reflective photosensor 107A, such that an output of the reflective photosensor 107A is changed to an "L" level. Since the reflective pattern 105 is positioned on the reflective photosensor 107B, an output of the reflective photosensor 107B goes to an "H" level.

Figure 23B:
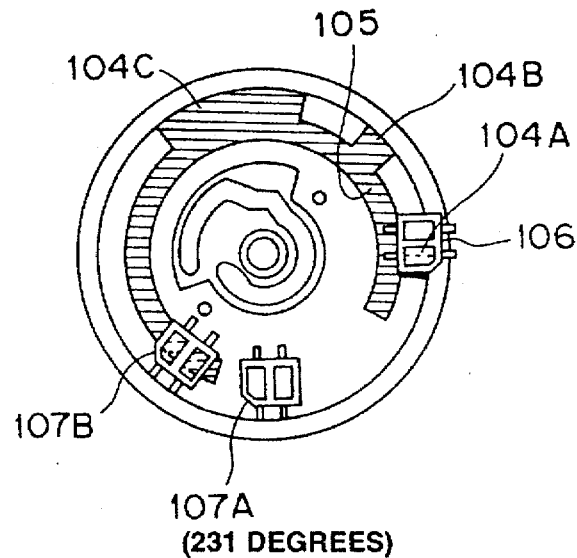

Referring to FIG. 26, an angular interval between 218° and 231° corresponds to a "stop" position. For the "stop" position, the running of the magnetic tape 4 ceases. For the angular interval of from 218° to 231°, corresponding to the "stop" position, the reflective pattern 104A is disposed on the reflective photosensor 106, as shown in FIGS. 23A and 23B. Thus the output of the reflective photosensor 106 goes to an "H" level. Since the reflective pattern 105 is not disposed on the reflective photosensor 107A, an output of the reflective photosensor 107A is at an "L" level. On the other hand, since the reflective pattern 105 is disposed on the reflective photosensor 107B, an output of the reflective photosensor 107B goes to an "H" level. Under the state of this "stop" position, there is formed a gap between the pinch roll 77 and the capstan 93, such that no tape tension is applied to the magnetic tape 4.

Figure 23C:
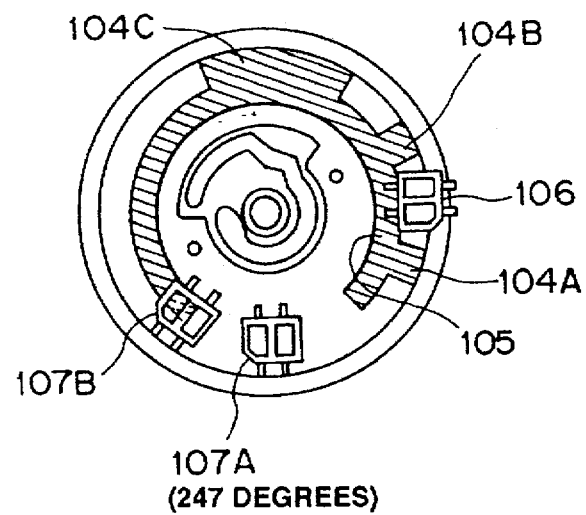

Referring to FIG. 26, the angular interval between 231° and 247° is an "interval D" position. For the angular interval of from 231° to 247°, the reflective pattern ceases to be disposed on the reflective photosensor 106, as shown in FIGS. 23B and 23C. Thus the output of the reflective photosensor 106 goes to an "L" level. Since the reflective pattern 105 is not disposed on the reflective photosensor 107A, an output of the reflective photosensor 107A is at an "L" level. On the other hand, since the reflective pattern 105 is disposed on the reflective photosensor 107B, an output of the reflective photosensor 107B goes to an "H" level.

Referring to FIG. 26, the angular interval between 247° and 263° is an "interval E" position. For the angular interval of from 247° to 263°, the reflective pattern ceases to be disposed on the reflective photosensor 106, as shown in FIG.

23C and 24A. Thus the output of the reflective photosensor 106 goes to an "L" level, as shown in FIG. 26. The reflective pattern 105 ceases to be disposed on the reflective patterns 107A or 107B. Thus the outputs of the reflective patterns 107A, 107B both go to an "L" level.

Figure 24A:
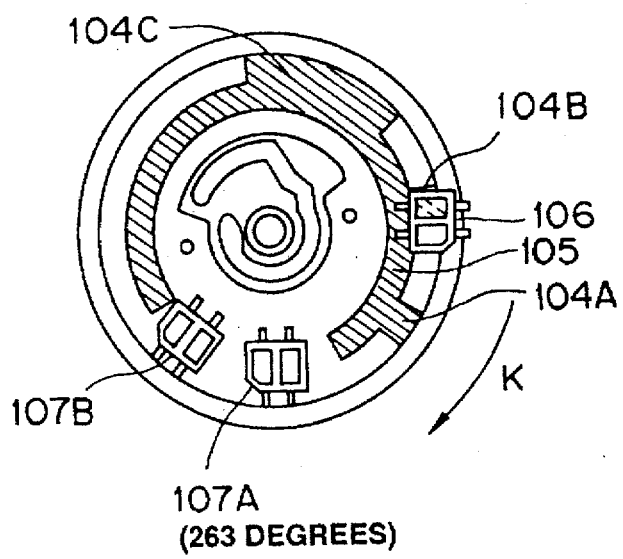
FIGS. 24A, 24B, and 24C are plan views illustrating the relative position between the photo sensor and the outer rim side patterns of the mode switch according to the present invention.
Figure 24B:
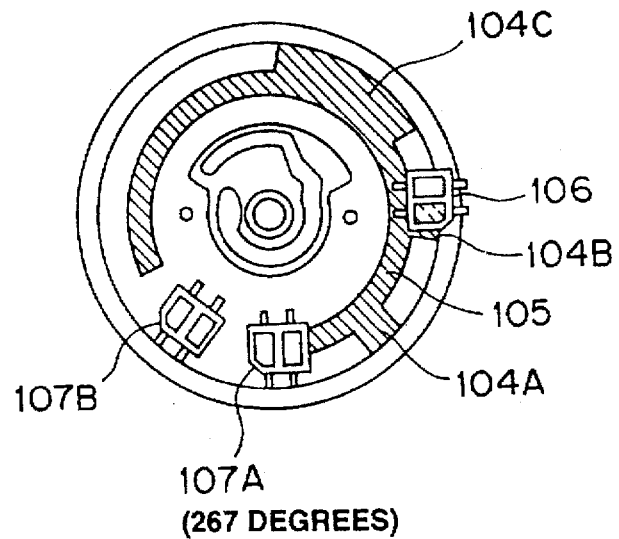

Referring to FIG. 26, the angular interval between 263° and 276° corresponds to the "search" position. This "search" position is a position for search in the fast feed and rewind directions. For the angular interval between 263° and 276°, corresponding to the "search" position, the reflective pattern 104B is disposed on the reflective photosensor 106, as shown in FIGS. 24A and 24B. Thus the output of the reflective photosensor 106 goes to an "H" level, as shown in FIG. 26. The reflective pattern 105 ceases to be disposed on the reflective patterns 107A or 107B. Thus the outputs of the reflective patterns 107A, 107B both go to an "L" level. Under the state of this "search" position, the magnetic tape 4 is not thrust by the pinch roll 77 against the capstan 93, such that the magnetic tape 4 can be fed at an elevated speed by the tape supply reel 8 and the tape take-up reel 9.

Referring to FIG. 26, the angular interval between 276° and 288.5° is an "interval E" position. For the angular interval of from 276° to 288.5°, corresponding to the interval "F" position, the reflective pattern ceases to be disposed on the reflective photosensor 106. Thus the output of the reflective photosensor 106 goes to an "L" level, as shown in FIG. 26. The reflective pattern 105 ceases to be disposed on the reflective patterns 107A or 107B. Thus the outputs of the reflective patterns 107A, 107B both go to an "L" level.

Figure 24C:
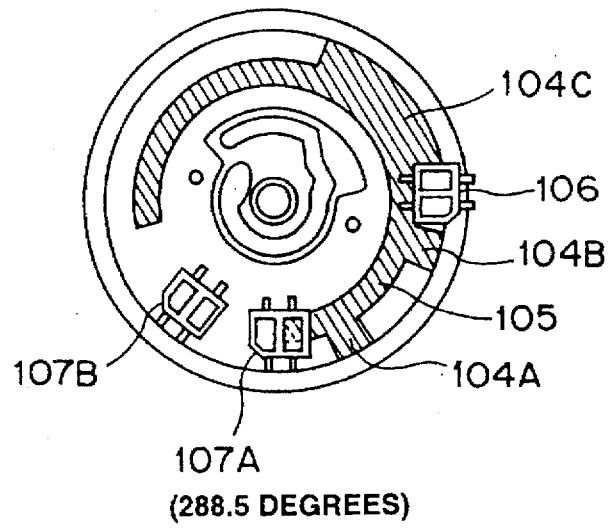

Referring to FIG. 26, the angular interval between 288.5° and 301° is an "interval G" position. For the angular interval of from 288.5° to 301°, corresponding to the "interval G" position, the reflective pattern ceases to be disposed on the reflective photosensor 106, as shown in FIGS. 24C and 25A. Thus, an output of the reflective photosensor 106 goes to an "L" level, as shown in FIG. 26. Since the reflective pattern 105 is disposed on the reflective photosensor 107A, an output of the reflective photosensor 107A goes to an "H" level. On the other hand, since the reflective pattern 105 is not disposed on the reflective pattern 107B, an output of the reflective photosensor 107B goes to an "L" level.

Referring still to FIG. 26, the angular interval of from 301° to 315° represents a "forward" position. The "forward" position is a position of recording/reproducing data of the magnetic tape 4. For the angular interval of from 301° to 315°, corresponding to the "forward" position, the reflective pattern 104C is disposed on the reflective photosensor 106, as shown in FIGS. 25A and 25B. Thus, an output of the reflective photosensor 106 goes to an "H" level, as shown in FIG. 26. Since the reflective pattern 105 is disposed on the reflective photosensor 107A, an output of the reflective photosensor 107 goes to an "H" level. On the other hand, since the reflective pattern 105 is not disposed on the reflective photosensor 107B, an output of the reflective photosensor 107B goes to an "L" level. Under the state of this "forward" position, the pinch roll 77 is thrust against the capstan 93 by the thrusting pressure exerted by the thrusting arm 78, as shown in FIG. 20, for applying a pre-set tension to the magnetic tape 4.

When the lower arm driving gear 35 has been rotated to the "forward" position, the second and third movement tape guides 55, 56 are halted at pre-set constant positions, because the first coil spring 51 installed between the lower ring driving gear 43 and the upper ring driving gear 45 is flexed without exerting the driving force. The fourth and fifth movement tape guides 59, 60 are also kept at pre-set constant positions because the second coil spring 52 installed between the second upper ring driving gear 47 and the second lower ring driving gear 49 becomes flexed in a similar manner.

Moreover, the tape tension exerted on the magnetic tape 4 by the movement tape guides 55, 56, 59 and 60 in the respective modes of the "search" position and the "forward" position can be set to desired values by the degree of flexure of the first and second coil springs 51 and 52.

At the "search" position, a search operation may be carried out more smoothly than at the "forward" position, because no spring force is stored in the coil springs 51, 52 such that the contact pressure exerted by the magnetic tape 4 on the outer peripheral surface 90 of the drum-shaped magnetic head 18 becomes weaker.

In this manner, the rotational angle of the lower arm driving gear 35 is detected by an output of the reflective photosensor 106. If the output of the reflective photosensor 106 gores to an "H" level, the system controller stores outputs of the reflective photosensors 107A, 107B in order to detect the positions of respective components making up the loading device 1. If an output of the reflective photosensor 106 is "H" and outputs of both the reflective photosensors 107A and 107B are both "H", the position is an "eject" position. If an output of the reflective photosensor 106 is at an "H" level and an output of the reflective photosensor 107A is at an "L" level, while an output of the reflective photosensor 107B is at an "H" level, the position is a "stop" position. If an output of the reflective photosensor 106 is "H" and outputs of both the reflective photosensors 107A and 107B are both "L", the position is an "search" position. If an output of the reflective photosensor 106 is at an "H" level and an output of the reflective photosensor 107A is at an "H" level, while an output of the reflective photosensor 107B is at an "L" level, the position is a "forward" position.

Thus, in an embodiment of the present invention, the reflective photosensor 106 is used for detecting the rotational position, while the other reflective photosensors 107A, 107B are used for generating the codes specifying the operating modes. Specifically, if the output of the reflective photosensor 106 goes high, the position code is stored in the system controller from outputs of the reflective photosensors 107A, 107B. The position code is inverted during an interval period when the output of the reflective photosensor 106 goes low. Consequently, there is no risk of the position detection width being changed due to mounting errors. Since a seal of the reflective patterns can be managed with high precision, high-precision position detection can be realized if only the precision of the reflective photosensor 106 is managed sufficiently.

In a preferred embodiment of the present invention, four position codes are formed by detecting a sole reflection pattern by two photosensors 107A, 107b spaced apart by 41° from each other. Detection precision can be improved since the sole reflective pattern suffices for detection, and this reflective pattern can be arranged near the outer rim of the lower arm driving gear 35.

Although the reflective photosensor is used in the above-described embodiment, a projection type photosensor may also be used in its stead.

The loading device according to the present invention is not limited to the tape cartridge of the type described above. Thus it may be applied a recording/reproducing tape cartridge, such as tape cartridges housing magnetic tapes of variable tape widths, such as 4 mm, ¼ inch, ⅞ inch, ¾ inch or 1 inch, audio tape cartridges or video tape cartridges.

We claim:

1. A loading device comprising:

driving means having a driving gear;

first transmission means having a transmission gear driven by said driving means;

first magnetic tape actuating means moved by said first transmission means for pulling out a magnetic tape placed on a tape supply reel;

second transmission means having a transmission gear driven by said first transmission means;

second magnetic tape actuating means moved by said second transmission means for pulling out the magnetic tape for abutting the tape thus pulled out against a sliding surface of a drum-shaped magnetic head;

third transmission means having a transmission gear driven by said second transmission means; and third magnetic tape actuating means moved by said third transmission means for pulling out the magnetic tape placed on a tape take-up reel;

wherein said first transmission means, second transmission means and the third transmission means are responsive to rotation of said gears for causing said first magnetic tape actuating means, second magnetic tape actuating means and said third magnetic tape actuating means to pull out said magnetic tape.

2. The loading device as claimed in claim 1 wherein said second transmission means includes a first transmission gear driven by said first transmission means, a second transmission gear mounted via a common pivot shaft on said first transmission gear, and an elastic member having its one end supported by said first transmission gear and having its other end supported by said second transmission gear, wherein a spring force generated by rotation of said first transmission gear is stored in said elastic member and thence transmitted to said second transmission gear, said spring force also causing the magnetic tape to be contacted under pressure with said sliding surface of said drum-shaped magnetic head via second magnetic tape actuating means.

3. The loading device as claimed in claim 1 wherein said third magnetic tape actuating means includes a roll supporting member moved by said third transmission means for pulling out the magnetic tape for abutting the magnetic tape against a magnetic tape control member, and a thrusting member moved by said third transmission means for thrusting said roll supporting member, said thrusting member thrusting said roll supporting member for abutting the magnetic tape against said magnetic tape control member via said roll.

4. The loading device as claimed in claim 1 wherein the transmission gear of one of said first, second and third transmission means has a position detection member for specifying the rotational position of said transmission gear.

5. The loading device as claimed in claim 4 further comprising detection means arranged in association with said position detection member, said detection means having a first sensor for detecting a rotational position of said transmission gear and a second sensor for detecting a code representing the operational mode associated with said rotational position.

6. The loading device as claimed in claim 5 wherein said first sensor of said detection means detects an interval period including a time point when the code outputted by said second sensor is changed.

* * * * *